(12) United States Patent
Liu

(10) Patent No.: US 11,565,213 B2
(45) Date of Patent: Jan. 31, 2023

(54) MEMBRANE DEVICE FOR WATER AND ENERGY EXCHANGE

(71) Applicant: Molecule Works Inc., Richland, WA (US)

(72) Inventor: Wei Liu, Richland, WA (US)

(73) Assignee: Molecule Works Inc., Richland, WA (US)

( * ) Notice: Subject to any disclaimer, the term of this patent is extended or adjusted under 35 U.S.C. 154(b) by 73 days.

(21) Appl. No.: 17/307,177

(22) Filed: May 4, 2021

(65) Prior Publication Data

US 2021/0316249 A1 Oct. 14, 2021

Related U.S. Application Data

(62) Division of application No. 16/236,122, filed on Dec. 28, 2018, now Pat. No. 11,065,575.

(Continued)

(51) Int. Cl.
*B01D 53/22* (2006.01)
*B01D 53/26* (2006.01)
(Continued)

(52) U.S. Cl.
CPC .......... *B01D 53/228* (2013.01); *B01D 53/268* (2013.01); *B01D 63/082* (2013.01);
(Continued)

(58) Field of Classification Search
CPC .... B01D 69/10; B01D 63/082; B01D 53/228; B01D 53/268; B01D 2053/222;
(Continued)

(56) References Cited

U.S. PATENT DOCUMENTS 2,982,110 A * 5/1961 Kramer ................. F24F 3/14
62/176.5
3,346,422 A 10/1967 Berger
(Continued)

FOREIGN PATENT DOCUMENTS

| CN | 205337056 U | * | 6/2016 |
| WO | 2020254208 A1 | | 12/2020 |
| WO | 2021259760 A1 | | 12/2021 |

*Primary Examiner* — Anthony R Shumate
(74) *Attorney, Agent, or Firm* — The Marbury Law Group, PLLC

(57) ABSTRACT

A device for exchange of water molecule and temperature between two fluids. The device comprises thin molecular sieve membrane sheets that allow water molecules to permeate through while blocking cross-over of the exchanging fluids. The device provides two sets of flow channels having a hydraulic diameter ranged from 0.5 to 2.0 mm for respective process and sweep fluid flows. The two sets of the channels are separated by a membrane sheet having a thickness less than 200 μm. The thin molecule sieve membrane may be prepared by forming an ultra-thin zeolite membrane layer on a porous metal-based support sheet which provides very high water permeance so that the exchange can be conducted in a compact membrane module at high throughput. The device can be used to remove water from a process stream of higher water content by use of a sweep fluid of lower water content or higher water affinity. For example, the device can be used to condition outdoor fresh air close to the temperature and humidity of indoor air by conducting humidity and heat exchange between the fresh air flow drawn from outdoors and waste air discharged indoors.

7 Claims, 26 Drawing Sheets

Related U.S. Application Data

(60) Provisional application No. 62/694,260, filed on Jul. 5, 2018.

(51) Int. Cl.

| | | |
|---|---|---|
| *B01D 63/08* | (2006.01) | |
| *B01D 69/10* | (2006.01) | |
| *F24F 3/147* | (2006.01) | |
| *B01D 71/02* | (2006.01) | |
| *F24F 3/14* | (2006.01) | |

(52) U.S. Cl.
CPC ........... *B01D 69/10* (2013.01); *B01D 71/028* (2013.01); *F24F 3/147* (2013.01); *B01D 2053/222* (2013.01); *F24F 2003/1435* (2013.01); *F24F 2203/02* (2013.01)

(58) Field of Classification Search
CPC ........... B01D 71/028; F24F 2003/1435; F24F 2203/02; F24F 3/147
See application file for complete search history.

(56) References Cited

U.S. PATENT DOCUMENTS

| | | | |
|---|---|---|---|
| 3,485,658 A | 12/1969 | Iler | |
| 3,497,394 A | 2/1970 | Berger | |
| 3,514,305 A | 5/1970 | Taylor | |
| 4,066,118 A * | 1/1978 | Goettl | F25B 19/00 62/235.1 |
| 4,307,776 A * | 12/1981 | Grun | E04B 1/7612 165/59 |
| 6,126,723 A | 10/2000 | Drost et al. | |
| 6,199,394 B1 * | 3/2001 | Maeda | F24F 3/1423 62/271 |
| 6,824,592 B2 | 11/2004 | Monzyk et al. | |
| 6,971,248 B1 * | 12/2005 | Wiggs | F25D 21/04 165/47 |
| 6,974,496 B2 | 12/2005 | Wegeng et al. | |
| 7,604,689 B2 | 10/2009 | Siverklev | |
| 7,824,766 B2 | 11/2010 | Eplee et al. | |
| 8,235,093 B2 | 8/2012 | Grinbergs et al. | |
| 8,673,059 B2 | 3/2014 | Leta et al. | |
| 10,363,516 B2 | 7/2019 | Sundaram | |
| 11,285,425 B2 | 3/2022 | Sauerbeck et al. | |
| 2004/0259326 A1 | 12/2004 | Hideo | |
| 2005/0274663 A1 * | 12/2005 | Roitman | B01D 5/0072 210/263 |
| 2006/0086121 A1 * | 4/2006 | Wiggs | F25D 21/04 62/515 |
| 2006/0096309 A1 * | 5/2006 | Wiggs | F25D 21/04 165/47 |
| 2009/0139107 A1 * | 6/2009 | Grunert | D06F 58/206 34/132 |
| 2009/0189617 A1 | 7/2009 | Burns et al. | |
| 2010/0003904 A1 | 1/2010 | Duescher | |
| 2010/0224555 A1 | 9/2010 | Hoek et al. | |
| 2010/0285348 A1 | 11/2010 | Murata et al. | |
| 2010/0304953 A1 | 12/2010 | Liu et al. | |
| 2011/0146941 A1 | 6/2011 | Benoit et al. | |
| 2012/0242281 A1 * | 9/2012 | Liu | H01M 10/441 320/134 |
| 2013/0032318 A1 | 2/2013 | Niebur | |
| 2013/0089687 A1 * | 4/2013 | Tabata | B01J 20/0292 428/116 |
| 2013/0295971 A1 * | 11/2013 | Liu | H04M 1/72451 455/458 |
| 2014/0076527 A1 | 3/2014 | Grinbergs et al. | |
| 2014/0326432 A1 | 11/2014 | Dean et al. | |
| 2015/0265975 A1 | 9/2015 | Liu et al. | |
| 2015/0306282 A1 | 10/2015 | Scanlon et al. | |
| 2018/0272260 A1 | 9/2018 | Robertson et al. | |
| 2020/0115291 A1 | 4/2020 | Faber et al. | |
| 2021/0077978 A1 | 3/2021 | Lai et al. | |
| 2021/0093993 A1 | 4/2021 | Strand et al. | |
| 2021/0215403 A1 * | 7/2021 | Feng | F25B 41/20 |

\* cited by examiner

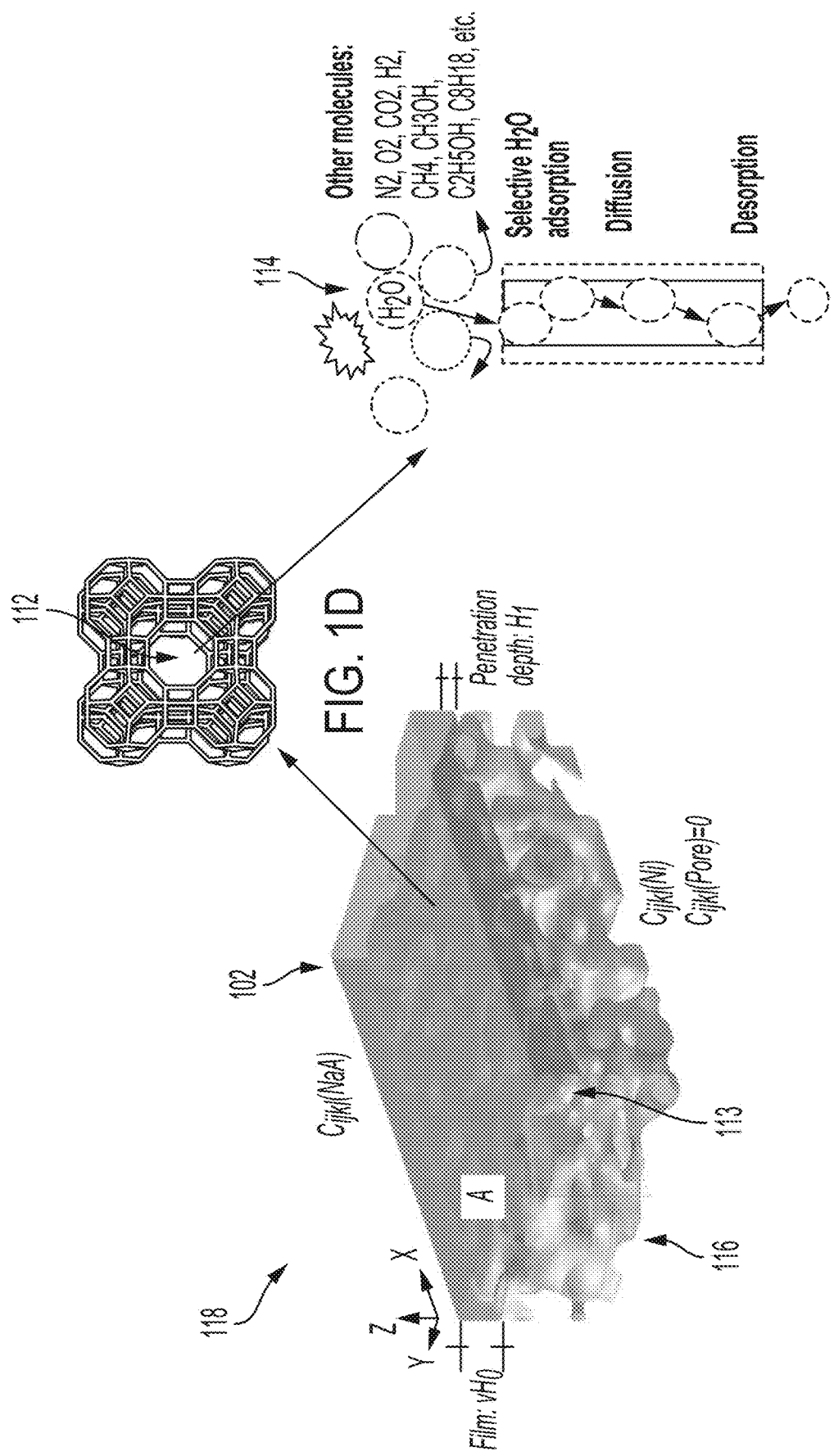

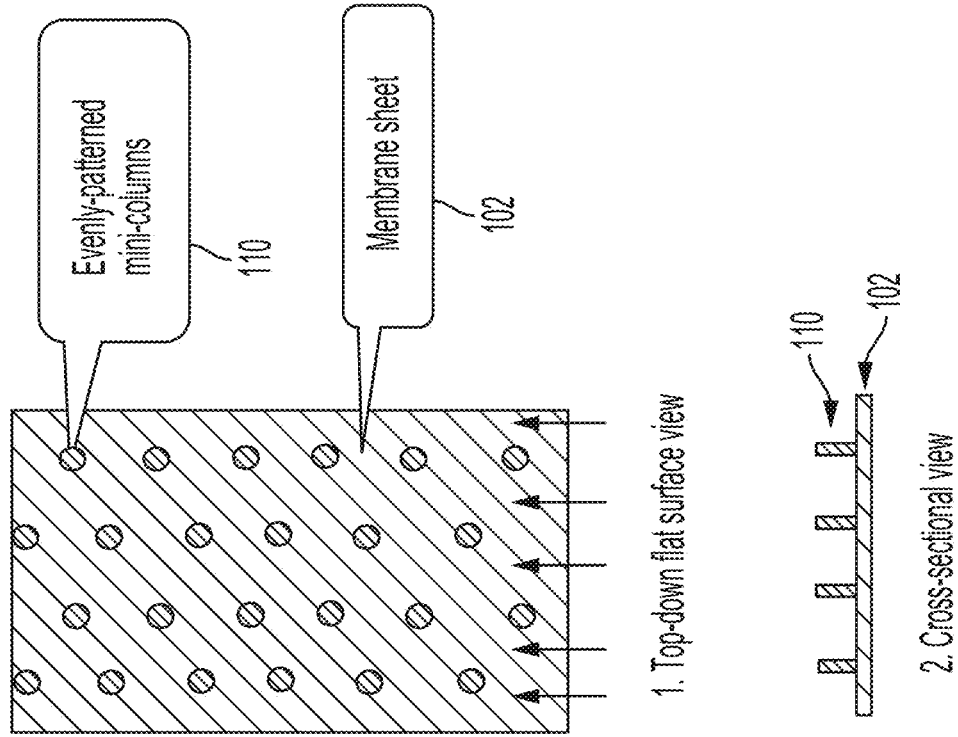
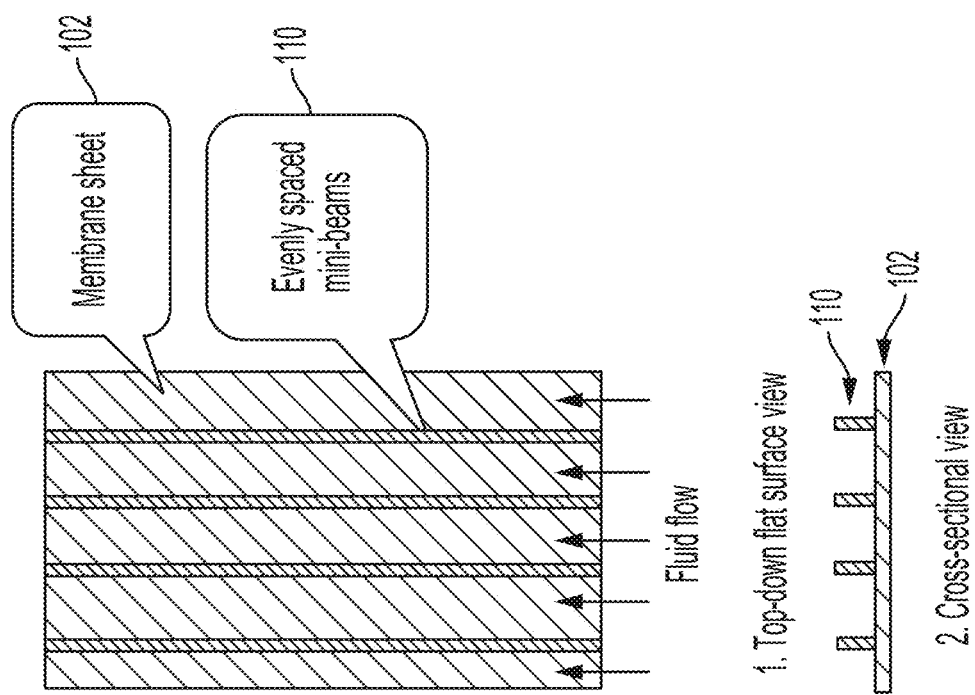
FIG. 5B
FIG. 5A

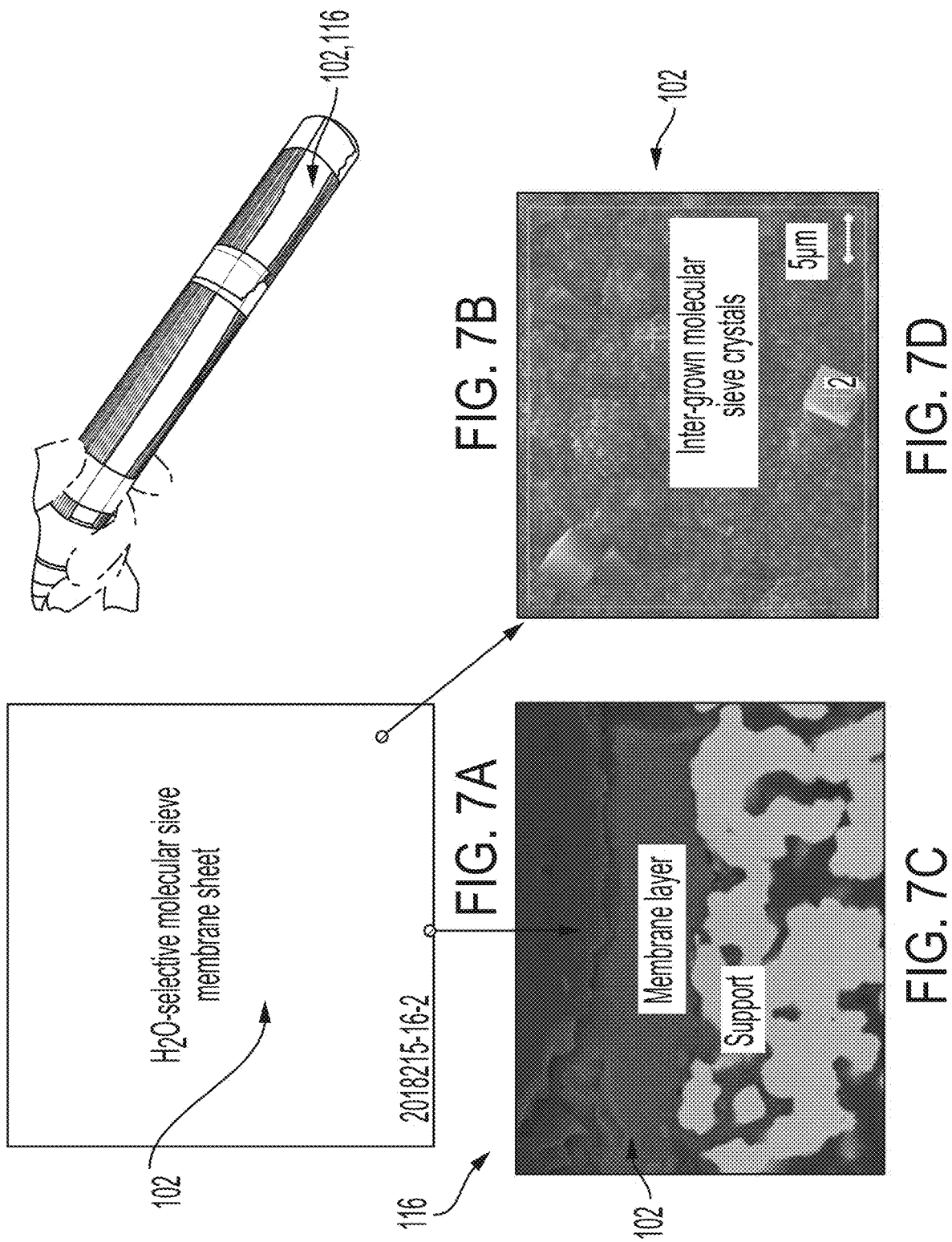

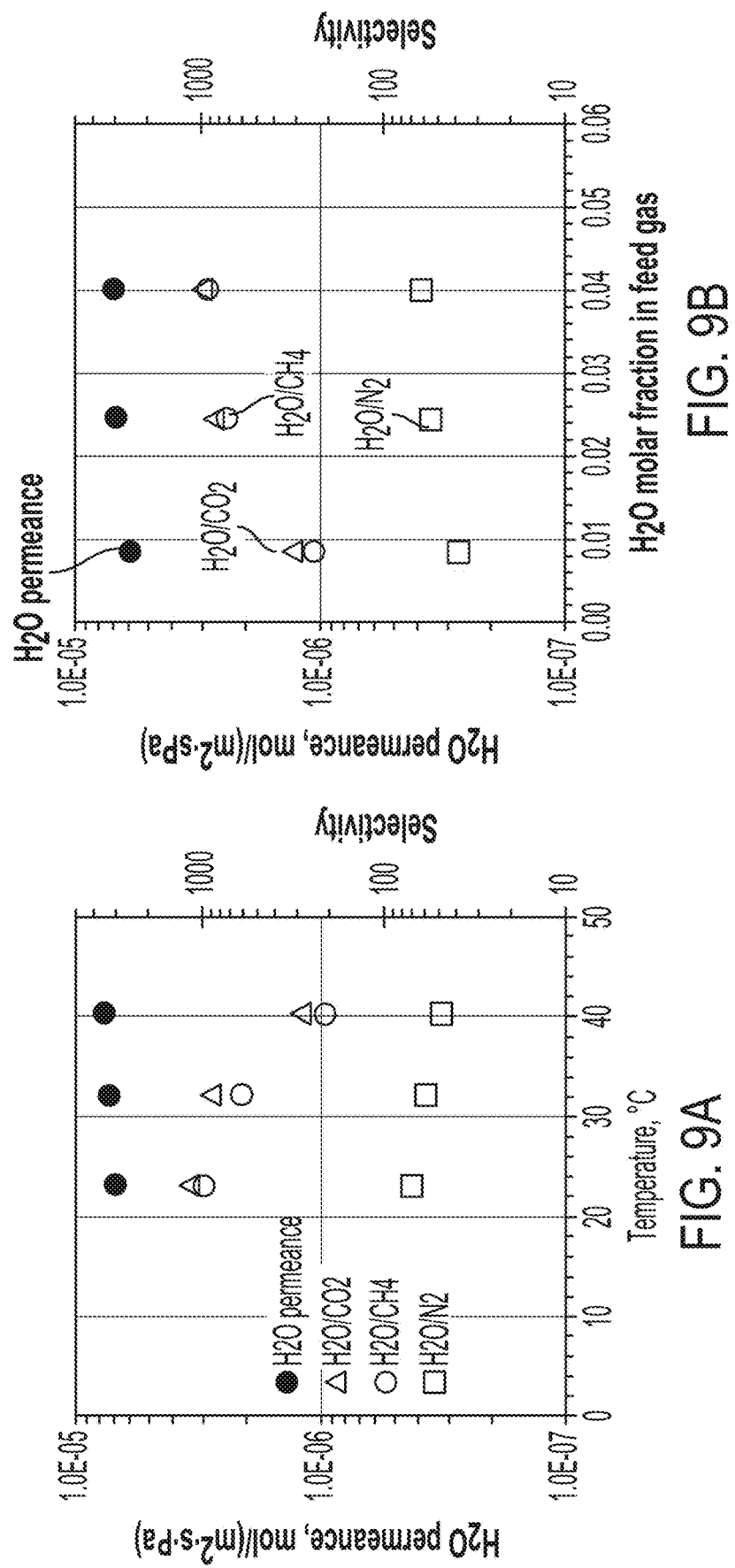

MEMBRANE DEVICE FOR WATER AND ENERGY EXCHANGE

CROSS REFERENCE TO RELATED PATENT APPLICATION

This application is a Divisional of U.S. patent application Ser. No. 16/236,122, filed Dec. 28, 2018, which claims the benefit of U.S. Provisional Application No. 62/694,260, Jul. 5, 2018, both of which are hereby incorporated herein by reference in its entirety.

FIELD OF INVENTION

The embodiments of the present invention are generally directed to mass and heat exchange systems and their operation, and specifically to humidity exchanging systems comprising thin $H_2O$-selective molecular sieve membrane sheets.

BACKGROUND OF INVENTION

Exchange of water molecules between one fluid (called as "process fluid" herein) and another fluid (called as "sweep fluid" herein) is used by many industrial processes and equipment. For example, a gas-phase process fluid of high humidity can be dehumidified through a water-permeable membrane by use of either a gas-phase sweep fluid of low humidity or a liquid-phase sweep fluid of higher water affinity. Similarly, dewatering of liquid-phase or mixed phase process fluid can be conducted through a water-permeable membrane by use of either a gas-phase sweep fluid of lower humidity or a liquid-phase sweep fluid of higher water affinity. Fundamentally, transport of water molecule across the membrane is driven by a chemical potential gradient between the two sides. In a vapor phase having low water vapor concentrations, the chemical potential gradient is often approximated by the partial pressure gradient of water vapor. When the two process fluids have different temperatures, the water exchange occurs concomitantly with heat exchange.

One application for humidity exchange is membrane dehumidifiers in which water vapor is removed from the humid gas through a membrane by sweeping the other side of the membrane with a dry gas stream. A practical example for humidity and heat exchange is energy recovery from ventilation air in buildings and living spaces, which is commonly known as enthalpy recovery ventilation (ERV). In the buildings and living spaces, outdoor fresh air is constantly brought in and the indoor air is constantly discharged to keep the oxygen level above a certain level and $CO_2$ and/or other harmful gases below a certain level. The outdoor air conditions can vary dramatically in different seasons, in different regions, and in different times of a day. To save energy in maintaining the temperature and humidity within a desirable level, ERV is used to conduct moisture and heat exchange between the two air streams so that the outdoor air is introduced into the buildings with the humidity and temperature close to the indoor conditions. If the building temperature and humidity are controlled at respective 20° C. and 50% relative humidity, when a humid and hot outdoor air is introduced, its heat and water vapor are transported to the discharged indoor air through ERV; when the cold and dry outdoor air is introduced, its heat and water vapor are gained from the discharged indoor air through ERV.

Common ERV products include (1) rotary wheels comprising a water sorbent and (2) heat exchangers comprising a water-permeable membrane. The membrane ERV product does not have any moving parts and has no or little air crossover compared to the rotating wheel ERV. In the past decade, several literature and patent publications discussing the development of membrane ERVs have been published. A plurality of parallel curvilinear rails was taught to form air flow channels between flat membrane sheets (Peter Karl Grinbergs, William Kwan "Flat plate heat and moisture exchanger" U.S. Pat. No. 8,235,093 B2; original Assignee: Nutech R. Holdings Inc.). An idea to form fluid flow channels by providing a plurality of dimples on planar plate pairs to be stacked was disclosed in Peter Karl Grinbergs, William Kwan, Gerard REIGER "Planar plate core and method of assembly" U.S. Patent Publication No. 20140076527 A1 (Original Assignee: Airia Leasing Inc.). A calendared paper-based sheet made of a mixture of thermoplastic organic fibers, micro porous particles, and a hydroscopic salt (e.g., lithium chloride, lithium bromide) was described to make plate-type heat exchangers with a moisture exchange function (Dustin Matthew Eplee, Kenneth R. Butcher "Sorption Paper And Method Of Producing Sorption Paper" U.S. Pat. No. 7,824,766 B2; original Assignee: Energy Wall, LLC). Water vapor-permeable sheets were pleated to provide a plurality of groups of air flow channels in stacking of the water-permeable sheets are disclosed in James Franklin Dean "Counter-Flow Energy Recovery Ventilator (ERV) Core" U.S. Patent Publication No. 20140326432 A1; original Assignee: Dpoint Technologies Inc.). Formation of flow channels by alternative stacking of membrane-containing shallow-pan like structures was disclosed in Jeffrey T. Benoit, Gregory M. Dobbs, Norberto O. Lemcoff "Energy Recovery Ventilator" US20110146941 A1; original Assignee: Carrier Corporation. Other variations in configuration of flow paths and/or channels are taught by Johan Siverklev "Device For Moisture Exchange Between Gas Flows" U.S. Pat. No. 7,604,689 B2 (current Assignee: Air to Air Sweden AB); and by Gerald William Niebur "Counter Current Heat Exchange Module" US 20130032318 A1 (original assignee: Gerald William Niebur).

Most prior arts teach about different ways to form flow channels for respective process and sweep fluid flow, and to arrange flow configurations. Innovations are desirable to make the membrane humidity exchange work effectively over a wide range of process conditions and dramatically reduce the size and/or volume of the devices as well as parasitic power consumption.

SUMMARY OF INVENTION

A highly permeable $H_2O$-selective molecular sieve (MS) membrane-based water and energy exchange device 100 is taught by embodiments herein. FIG. 1A illustrates molecular sieve membranes 102 made in a thin sheet form are stacked one by one to form alternative process flow channels 104 and sweep flow channels 106. With the highly-permeable membrane 102, the channel height should be small enough to minimize transport resistance for $H_2O$ molecule to diffuse from bulk fluid onto the membrane surface 108. This is because the flow inside the channels 104, 106 is in a laminar flow mode (FIG. 1A). The channel height is preferably less than 1.5 mm. The membrane sheets 102 are kept separated using supporting structures as spacers, i.e. process channel spacer 110a and sweep channel spacer 110b (FIG. 1B). The spacers 110 may be added during the sheet-by-sheet assembly process, pre-fabricated on the membrane sheet, or pre-fabricated on a frame. To minimize pressure drop and stagnant spaces inside the channels 104, 106, straight or smooth flow channels 104,106 are preferred. The open-front-area (OFA) fraction, as defined as the ratio of the open area available for the process flow to the overall cross-sectional area of the channel, is preferably greater than 0.5 to minimize the dead space inside the channel. The open membrane area (OMA) fraction, as defined as a ratio of membrane area exposed to convective channel flow to the packaged membrane area, is preferably greater than 0.5 to minimize blocking of the spacer to the membrane surface. Calculation of these two parameters for spacers with a straight rectangle shape as shown in FIG. 1B can be done with the following equations:

$$OFA = \frac{l_s \cdot h_p}{(l_w + l_s) \cdot h_p}$$

$$OMA = \frac{l_s \cdot l_Z}{(l_w + l_s) \cdot l_Z}$$

Where OFA=open-front-area (OFA) fraction; OMA=open membrane area (OMA); $l_s$=spacing between the spacers; $l_w$=width of the spacer; hp=channel height (=spacer height for a rectangle-shaped spacer); $l_z$=spacer length along the flow direction (z-axis).

The spacing between the spacers 110a, 110b is preferably greater than the channel height to increase the hydraulic diameter. The channel height and spacer 110 arrangement for the process flow is same or similar to that for the sweep flow.

The $H_2O$-selective MS membrane, illustrated in FIGS. 1C-1E, provides high $H_2O$ permeance, such as greater than $4 \times 10^{-6}$ mol/(m²·s·Pa), and high selectivity, such as greater than 2, toward $H_2O$ over other targeted molecules, including carbon dioxide, hydrocarbons, and air. The $H_2O$ permeance and selectivity as defined by the following equations can be experimentally measured:

$$P_i = \frac{n_{mi}}{SA_m \cdot \Delta p_i}$$

$P_i$=permeance of water molecule, mol/m²/s/Pa
$n_{mi}$=permeation rate of water molecule through the membrane, mol/s
$SA_m$=membrane area tested, m²
$\Delta p_i$=partial pressure differential of water molecule across the membrane, Pa $$SF_{i,j} = \frac{y_i/y_j}{x_i/x_j}$$

$$S_{ij} = \frac{P_i}{P_j}$$

$SF_{ij}$=separation factor of water molecule to other molecule j
$y_i$=molar fraction of water molecule in permeate side
$y_j$=molar fraction of other molecule j in permeate side
$x_i$=molar fraction of water molecule in feed side
$x_j$=molar fraction of other molecule j in feed side $S_{ij}$=Selectivity of water molecule to other molecule j
$P_i$=permeance of water molecule
$P_j$=permeance of other molecule j The selectivity of water molecules 114 over other molecules can be characterized by use of either separation factor or relative permeance measured with gas mixtures. The separation factor ($SF_{ij}$) measures enrichment times of water molecules 114 to the other molecules between the permeate and feed and thus, is measured with a mixture. The separation factor or selectivity ($S_{ij}$) for water molecule 114 to other molecules is preferred above 10. In the literature studies, the selectivity is often calculated as a ratio of relative permeances that are measured with single or pure feed. The permeance in the embodiments disclosed herein are preferably measured with actual mixtures. For molecular sieve membranes 102, the permeance measured with a single component may not be useful for practical applications.

The MS membrane 102 comprises $H_2O$-selective MS crystals having lattice framework containing permanent pores 112 (pore size<1 nm) for water molecules to go through, as illustrated in FIGS. 1C-1E. The permanent pores 112 mean that the pore structures are not affected by the operating conditions. The $H_2O$-selective MS crystals are prepared on a porous support sheet 116 as a coating layer 102 with thickness typically less than 20 μm. The porous support sheet 116 should have high permeance, such as greater than $4 \times 10^{-5}$ mol/(m²·s·Pa), so that the diffusion transport resistance through the support sheet 116 is not a limiting factor. Preferably, the support sheet 116 is as thin as possible so that it does not take up much space in the device 100. The overall thickness of the membrane/support sheet assembly 118 is preferably less than 200μ·m. The preferred support sheet 116 has a pore size on the surface coated with the MS membrane 102 in the range of 0.05 to 2 μm, with pores 113 greater than 2 μm less than 10%.

BRIEF DESCRIPTION OF THE DRAWINGS

FIG. 1C is a perspective view of a $H_2O$-selective molecular sieve membrane according to an embodiment.

FIG. 1D is a line drawing illustrating the crystal lattice framework of the $H_2O$-selective molecular sieve membrane of FIG. 1C.

FIG. 1E is a schematic diagram illustrating selective $H_2O$ permeation through the $H_2O$-selective molecular sieve membrane of FIG. 1C.

FIG. 5A is a schematic diagram illustrating continuous beam support structure between membrane sheets in an exchange device according to an embodiment.

FIG. 5B is a schematic diagram illustrating patterned mini column support structure between membrane sheets in an exchange device according to an embodiment.

FIGS. 7A-7D are photographs $H_2O$-selective NaA-type membranes grown on a porous metal sheet.

FIG. 9A is a plot of the $H_2O$ permeance and selectivity over $CH_4$, $CO_2$ and Na versus temperature.

FIG. 9B is a plot of the $H_2O$ permeance and selectivity over $CH_4$, $CO_2$ and $N_2$ versus $H_2O$ molar fraction in feed air.

DETAILED DESCRIPTION OF THE INVENTION

Figure 1A:
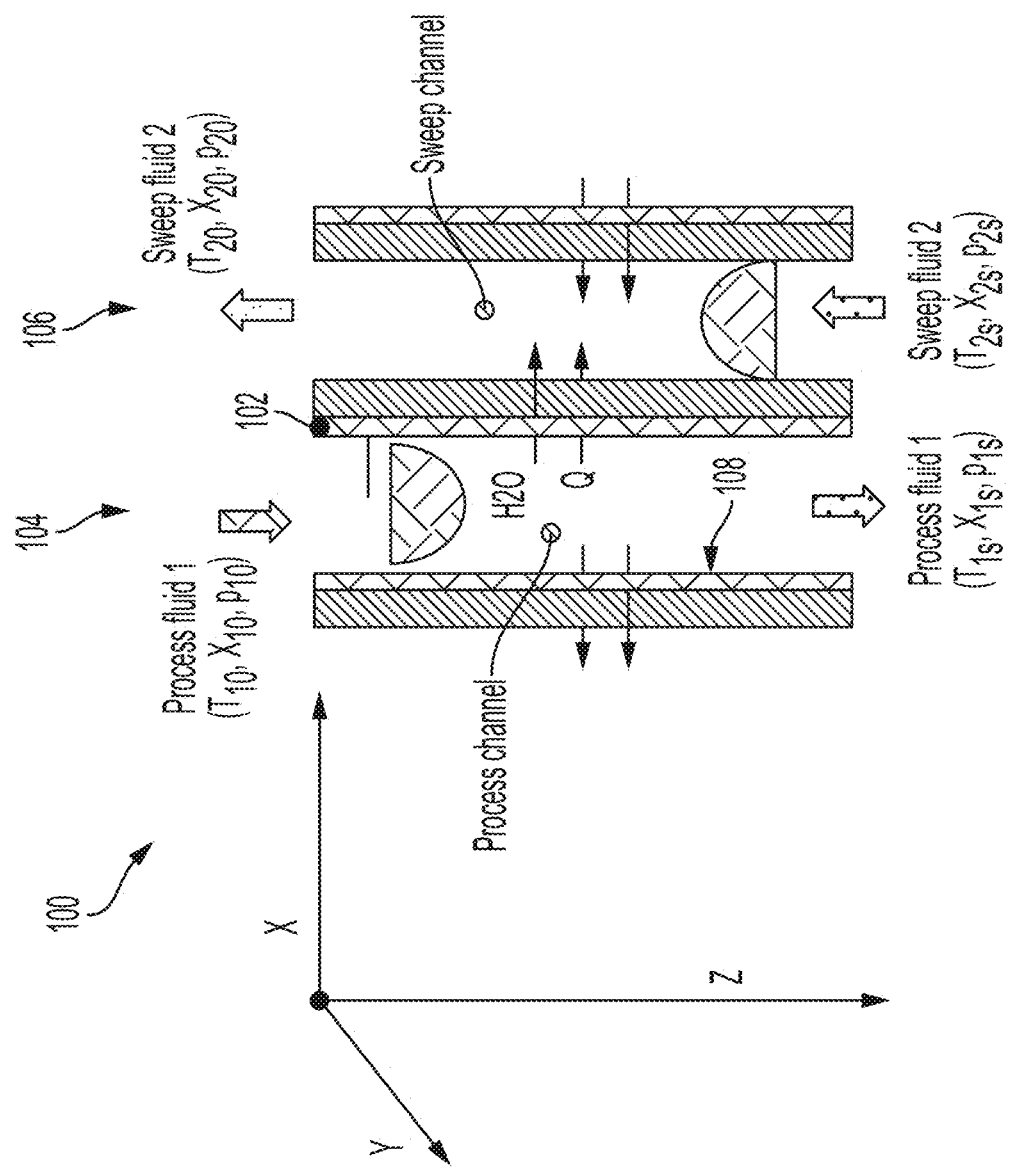
FIG. 1A is a schematic diagram illustrating water and heat exchange along the flow direction in a water molecule-selective molecular sieve membrane sheet according to an embodiment.

The $H_2O$-selective membrane assemblies 118 of embodiments herein include a very thin membrane layer 102 comprising molecular sieve crystals supported on a thin porous support sheet 116, as depicted in FIG. 1C. The MS crystals have well-defined porous structures in its lattice framework so that its porous structure is stable under the application conditions. The stable porous structures provide highly-permeable diffusion channels 112 for water molecule transport. The well-defined pore size provides a molecular sieving function by size exclusion, i.e., molecules greater than the pore size are excluded. More importantly, certain molecular sieve materials have high affinity toward water adsorption over other molecules, such as zeolites made of $Al_2O_2$, $SiO_2$, and $Na_2O$ metal oxide compounds. These zeolite materials can take up water from fluids of very low water concentrations (~ppm level) at temperatures up to about 150° C. When the molecular sieve pores 112 are adsorbed with water molecules 114, permeation of other molecules of same or even smaller sizes than water is blocked while the adsorbed water can diffusion across the membrane 102 via a surface diffusion mechanism rather than gas-phase diffusion. Thus, the MS crystal provides high selectivity toward water molecules 114 over other molecules through both size exclusion and selective adsorption chemistry, and provides a stable porous structure for water molecules 114 to diffuse through rapidly.

Due to the above properties, these molecular sieve membrane materials 102 are preferred over other water-selective fluids and materials, such as polymers, ionic liquids, and graphene oxide. Those materials do not provide a stable porous structure to achieve both high water selectivity and permeance. Selective water separation with those materials typically follows a solute diffusion mechanism. Water molecules 114 dissolve into the membrane material 102 as a solute and the dissolved water molecules 114 diffuse through the membrane 102. The selectivity toward water molecule 114 over other molecules is determined by relative absorption and the solute diffusion rate constants of the water molecule 114 to other molecules. The membrane volume and structures can be significantly affected by the amount of water absorbed, which creates problems in maintaining the membrane structure and performance over a wide range of application conditions. For example, the membrane 102 may be swollen too much while processing a hot humid gas and get cracked when exposed to a drier gas.

The molecular sieve crystals are preferred over other porous, water-selective metal oxides, such as silica and alumina. Those metal oxide materials can be made with high BET surface area comparable to molecular sieve crystals and provide high-water adsorption capacity. However, those materials do not provide well-defined porous structures having molecular sieving functions and are not stable over a wide range of application conditions for a long time.

The molecular sieve crystals in the membrane layer 102 are preferably connected to each other to form fast water-transport paths. Thus, the volume fraction of the molecular sieve crystals in the membrane layer 102 is preferably greater than 50%. Greater than 90% or pure molecular sieve crystals are further preferred. The presence of desired molecular sieve crystal structures and volume fraction can be analyzed by X-ray diffraction and electron microscopy. The crystal phase, crystal size, and crystal purity can be obtained by XRD analysis. A scanning electron microscope (SEM) equipped with energy-dispersive X-ray spectroscopy is an effective tool to reveal crystal morphology and atomic composition of a membrane layer 102.

A membrane layer 102 comprising >50 vol % molecular sieve crystals is too fragile to be made as a self-supported, robust thin film. Thus, the ultra-thin membrane layer 102 is supported on a porous support sheet 116 in the following embodiments. The membrane layer thickness is preferably less than 20 μm and more preferably less than 10 μm. If the membrane layer 102 is too thick, various defects could be formed in addition to high transport resistance. The pore structure of a support surface that interfaces with the membrane layer 102 has a large impact on the formation of a high-performance membrane layer 102. The surface pore size of the support 116 should be substantially free of large pores to have a continuous high-quality membrane film. The fraction of the surface pores 113 greater than 2 μm is preferably less than 10%. The support sheet 116 should be sufficiently rigid and strong that the membrane layer 102 is not be damaged during preparation, handling, packaging, and/or usage. For example, the membrane layer 102 should not be damaged when a membrane sheet 102 is lifted from one side or when the membrane sheet 102 is bent to a radius greater than 2 cm. The membrane sheet 102 should not bow when it is supported on beams 110 of greater than 2 mm spacing. The support sheet 116 should be highly permeable and not impose significant diffusion resistance. The gas or air permeance of the support sheet 116 is preferably above $1.0 \times 10^{-4}$ mol/(m²·s·Pa). The support sheet 116 should be as thin as possible to minimize its weight and volume in the device. The thickness is preferably less than 0.2 mm. Such a support sheet 116 can be made of polymeric and metallic materials. Thin metal-based porous metal sheets 116 made of nickel alloy or steel are one of preferred supporting materials. A hydrophilic porous sheet 116 made of stable and inexpensive polymeric materials, such as polyethersulfone, may also be used as the supporting material.

Figure 2:
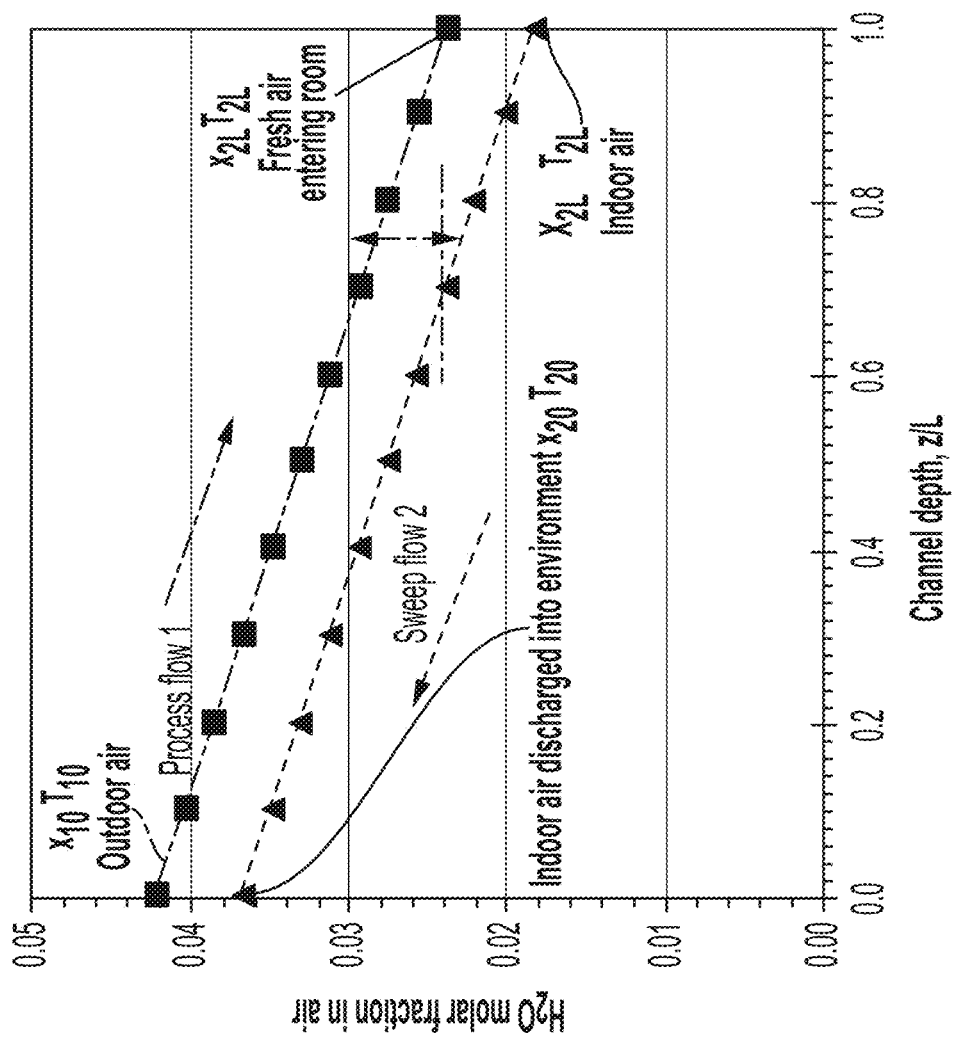
FIG. 2 is a plot illustrating moisture exchange between two air flows through a membrane device.

The working process of water exchange through a membrane device 100 can be illustrated with the exchange of humidity between outdoor fresh air (process fluid, flow 1) and discharged indoor waste air (sweep fluid, flow 2) in counter-current flow, as shown in FIG. 2. Both air flows are assumed to be nearly atmospheric in pressure. The water vapor molar fraction in process flow 1 decreases monotonically along its flow direction, while the water molar fraction in the sweep flow 2 increases monotonically along a flow direction that is opposite to process flow 1. Water molecules 114 are transported from the process flow 1 to the sweep flow 2, driven by the molar fraction difference between the two fluids. The membrane permeance has a direct impact on the membrane area usage and channel length. In the counter-current exchange, the partial pressure gradient of water vapor across the membrane 102 may be calculated by the following equation:

$$\Delta p_i = p_1 \cdot x_{1,i} - p_2 \cdot x_{2,i}$$

$\Delta p_i$=partial pressure differential of water molecule i across the membrane, Pa If $p_1 \approx p_2 = p_0$ $$\Delta p_i = P_0 \cdot (x_{1,i} - x_{2,i})$$

$x_{1,i}$=molar fraction of water molecule i in process flow 1
$x_{2,i}$=molar fraction of water molecule i in sweep flow 2

The extent of humidity exchange can be characterized by an effectiveness factor as defined by the following equation:

$$\eta_w = \frac{x_{20} - x_{2L}}{x_{10} - x_{2L}}$$

$x_{10}$=water molar fraction of process flow 1 at its introduction point
$x_{20}$=water molar fraction of sweep flow 2 at the introduction point of the process flow
$x_{1L}$=water molar fraction of process flow 1 at its exit point
$x_{2L}$=water molar fraction of the sweep flow 2 at its introduction point
$\eta_w=0$ when $x_{20}=x_{2L}$, i.e., no humidity exchange
$\eta_w=1$ when $x_{20}=x_{10}$, i.e., complete exchange of water molecule such that no difference in the water molar fraction exists between the two flows at the introduction point of the process flow 1.

Assume that the two gas flows have the same flow rate and approximately same pressure, and the pressures are nearly constant inside the exchanging device. The membrane area required to achieve a given effectiveness value can be described by the following equation:

$$\frac{SA_m \cdot P_w}{n_1 \cdot p_0} = \frac{\eta_w}{1 - \eta_w}$$

$P_w$=H₂O permeance of the membrane, mol/m²/s/Pa
$n_1$=molar flow rate of process gas, mol/s
$p_0$=pressure of the process gas, Pa Heat transfer between the two flows across the membrane 102 is described by the following equation:

$$Q_t = SA_t \cdot U_t \cdot (T_1 - T_2)$$

$Q_t$=thermal energy transport rate, W
$SA_t$=membrane area available for heat transfer, m²
$T_1$=temperature of process fluid—flow 1, K
$T_2$=temperature of sweep fluid—flow 2, K
$U_t$=heat exchange coefficient, w/(m²·K)

The heat exchange effectiveness factor is defined as follows:

$$\eta_t = \frac{T_{10} - T_{1L}}{T_{10} - T_{2L}}$$

$T_{10}$=temperature of process flow 1 at its introduction point
$T_{20}$=temperature of sweep flow 2 at the introduction point of the process flow
$T_{1L}$=temperature of process flow 1 at its exit point
$T_{2L}$=temperature of sweep flow 2 at the exit point of process flow 1
$\eta_t=0$ when $T_{10}=T_{1L}$, i.e., no heat exchange.
$\eta=1$ when $T_{1L}=T_{2L}$, i.e., complete heat exchange such that no temperature difference exists between the two flows at the introduction point of sweep flow 2.

Assume that two gas flows have the same flow rate, the same specific heat capacity, and the same pressures that are nearly constant inside the exchanging device 100. The membrane area required to achieve a given effectiveness value of heat exchange can be described by the following equation:

$$\frac{SA_t \cdot U_r}{n_1 \cdot c_p} = \frac{\eta_t}{1-\eta_t}$$

$C_p$=specific heat capacity of process gas, J/mol/K

Figure 3:
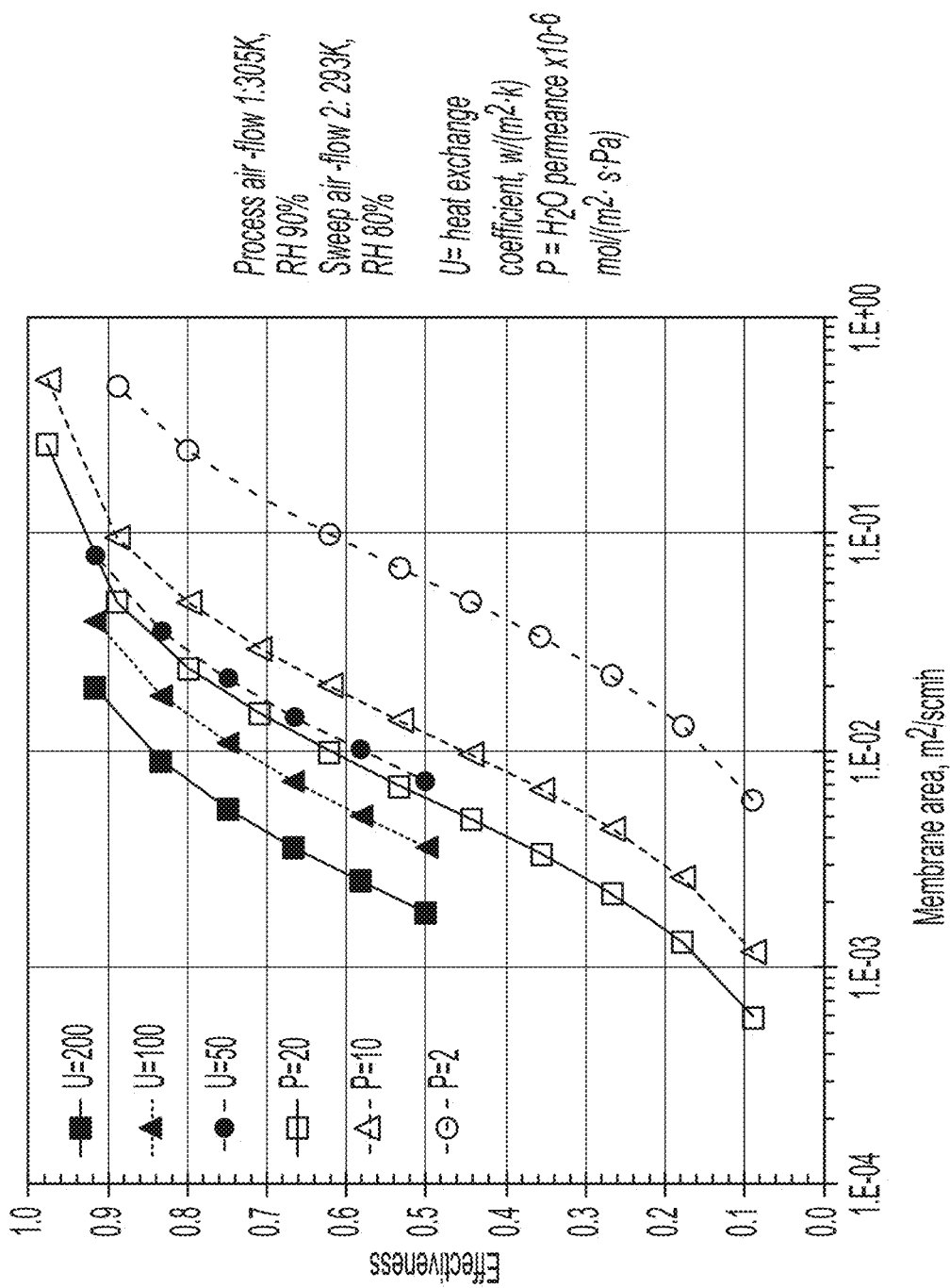
FIG. 3 is a plot illustrating the impact of $H_2O$ permeance and heat exchange coefficient on respective latent and sensible energy exchange effectiveness.

The impact of water permeance ($P_w$) and heat exchange coefficient (Ut) on the respective effectiveness factors are shown in FIG. 3. In the HVAC industry, the humidity and temperature change in the air are referred as latent and sensible energy, respectively. For given $P_w$, the effectiveness factor increases nearly proportionally with the membrane area normalized by the process air flow rate (m² per standard cubic meters per hour (scmh)). However, the increment becomes smaller and smaller with further increasing the membrane area. Theoretically, it takes an infinite amount of surface area to realize an effectiveness of 1. For practical application purposes, the effectiveness factor is targeted at about 0.45-0.80. The impact of water permeance is significant. At a water permeance of $2 \times 10^{-6}$ mol/(m²·s·Pa), the effectiveness factor is only 0.5 at a normalized membrane area of 0.06 m²/scmh. If the permeance is increased to $10 \times 10^{-6}$ mol/(m²·s·Pa), an effectiveness of 0.5 can be achieved at a normalized membrane area of 0.012 m²/scmh or the effectiveness can reach about 0.83 with the same membrane area. To achieve a comparable effectiveness of humidity exchange with the membrane of permeance $20 \times 10^{-6}$ mol/(m²·s·Pa), the heat exchange coefficient is about 50 w/(m²·K).

The calculation results indicate the value of membrane permeance to reduction of the membrane area usage. The permeance also has indirect impact on the device size, pressure drop, and parasitic power consumption. The pressure drop for laminar flow inside small channels can be calculated by use of the following equation:

$$\Delta p = 32 \frac{V \cdot \mu}{d_h^2} \cdot L$$

V=fluid linear velocity inside the channel, m/s
μ=fluid viscosity, Pa·s
$d_h$=channel hydraulic diameter, m
L=channel length, m The gas fluid should be pumped to overcome the pressure drop. With humidity and thermal exchange as an example, the power consumption for an air fan can be estimated by use of the following equation:

$$w_e = n_1 RT \ln\left(1 + \frac{\Delta p}{p_0}\right) / \eta_p$$

Given the small pressure drop, isothermal expansion is assumed:

R=Gas constant, 8.314 J/mol
T=temperature, K
$p_0$=atmospheric pressure air, 105 Kpa
$\eta_p$=fan efficiency (assume 65%)

Figure 4B:
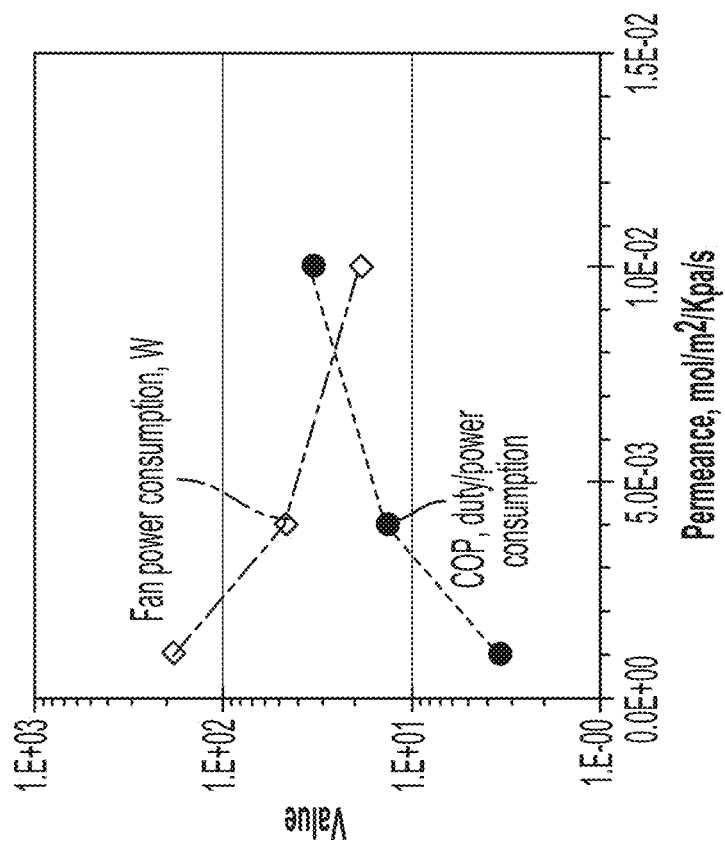
FIG. 4B is a plot illustrating the impact of fan power and coefficient of performance on pressure drop and membrane area required to achieve 77% effectiveness.
Figure 4A:
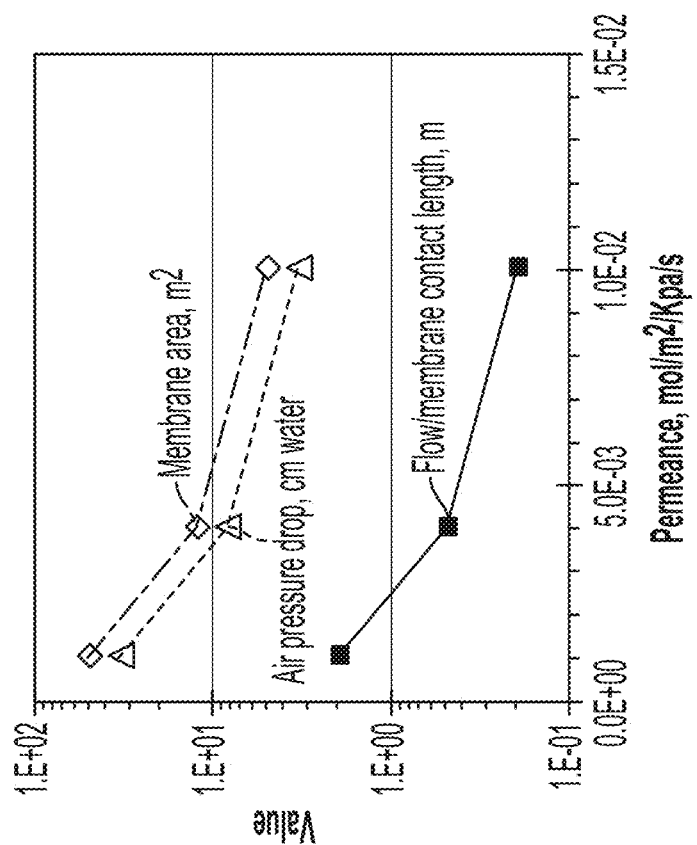
FIG. 4A is a plot illustrating the impact of $H_2O$ permeance on pressure drop and membrane area required to achieve 77% effectiveness.

The coefficient of performance (COP), i.e., ratio of latent energy exchanged to electrical power consumed, is calculated as follows:

$$COP = \frac{E_{latent}}{w_{e,1} + w_{e,2}} = \frac{\Delta H_v \cdot n_1 \cdot (x_{10} - x_{1L})}{w_{e,1} + w_{e,2}}$$

Where $E_{latent}$=latent energy exchanged, W
$\Delta H_v$=heat of water evaporation, J/mol
$n_1$=molar flow rate of process air-flow 1, mol/s
$x_{10}$=molar fraction of water vapor in process flow 1 at the entering point.
$x_{1L}$=molar fraction of water vapor in process flow 1 at the exit point.
$W_{e,1}$=air fan power for process flow 1, W
$W_{e,2}$=air fan power for sweep flow 2, W In an example, the membrane stack core comprises 252 sets of 10 cm×0.1 cm channels 104, 106 for respective process flow 1 and sweep flow 2 at a flow rate of 2.1 ST m³/min. The channels have a hydraulic diameter of 1.0 mm. Then, the impact of water permeance on the membrane area usage, module size, power consumption, and COP are shown in FIGS. 4A and 4B. The polymer membranes reported in the literature typically have a permeance in the order of $1.0^{-6}$ mol/m²/s/Pa, while the molecular sieve membrane 102 of the present embodiment has a water permeance in the order of $1.0^{-5}$ mol/m²/s/Pa. As the membrane permeance is increased from $1.0^{-6}$ to $1.0^{-5}$ mol/m²/s/Pa, the membrane area usage, the channel length, and air pressure drop are all deceased by 10 times (FIG. 4A). Due to the decreased air pressure drop, air fan power consumption is reduced, and COP is increased (FIG. 4B). The size and noise of air fans increases with its power consumption.

One design parameter for the exchange device 100 of the present embodiment is that the fluid linear velocity inside the channel should be within a certain range. With a highly-permeable membrane, transport of water molecules 114 from bulk fluid onto the membrane surface can become a limiting factor. The transport rate should be sufficiently high to utilize the membrane permeance. It is found that for a given membrane material, the mass transport rate and actual permeance obtained from device are significantly affected by fluid linear velocity inside the channels 104, 106. The linear velocity impact is described by the following equation:

$$P = \frac{P_m}{1 + \left(\frac{a}{V}\right)^b}$$

Where $P_m$=intrinsic permeance of the membrane
P=permeance obtained with a device
V=superficial linear velocity of fluid inside the channel
a=process parameter
b=process parameter The superficial linear velocity is calculated as follows:

$$V = \frac{Q_v}{SA_f}$$

Where Qv=volume flow rate of fluid inside the channel, m³/s $SA_f$=cross-sectional area of the channel for fluid to flow, m².

The process parameters a and b are affected by the channel design and fluid properties. For humidity and heat exchange of gas streams in the device of present embodiment, the preferred linear velocity is 100 to 1000 cm/s. If the velocity is too high, the pressure drop becomes too large. If the velocity is too low, the permeance can be drastically less than the membrane permeance.

Figure 1B:
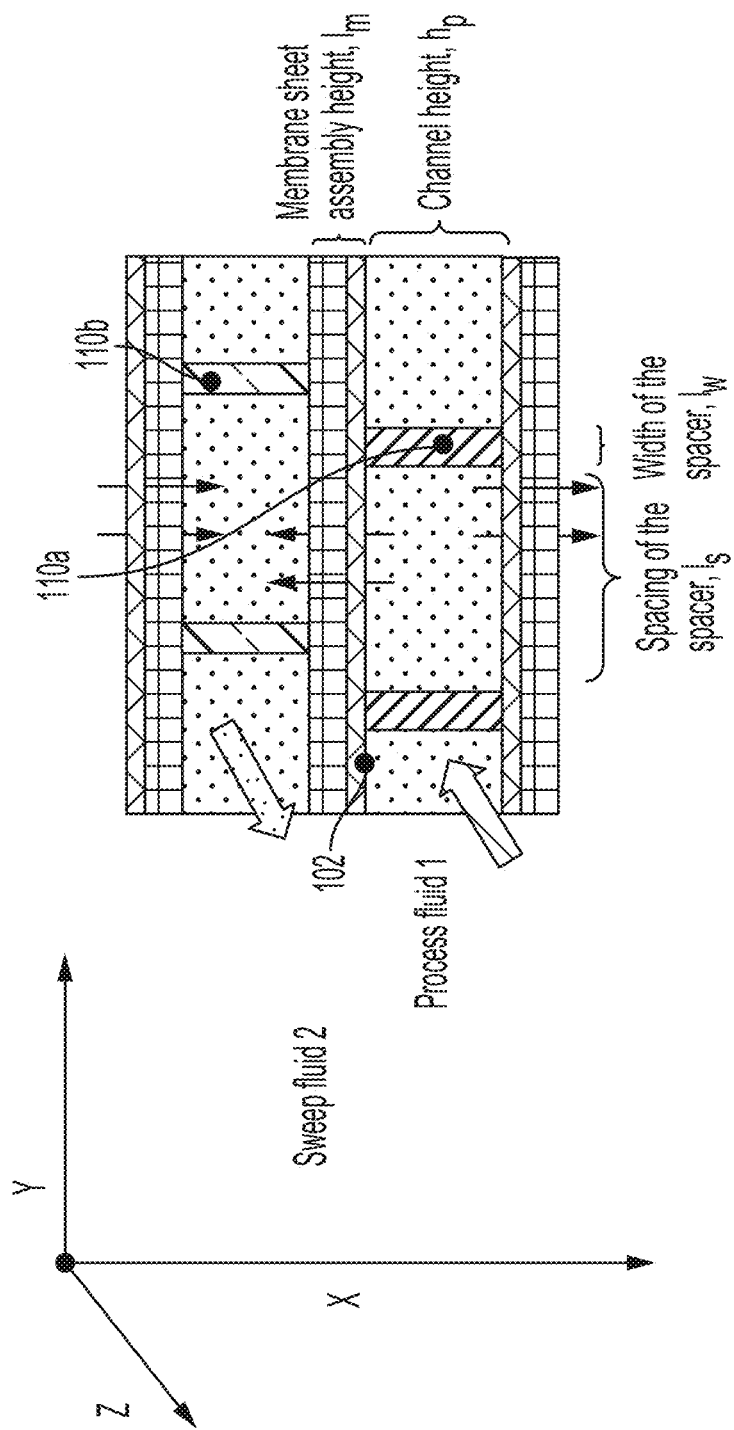
FIG. 1B is a schematic diagram illustrating water and heat exchange perpendicular to the flow direction in a water molecule-selective molecular sieve membrane sheet according to an embodiment.

A spacing/supporting structure 110 may be used to keep the thin membrane sheets 102 apart in the exchange device 100 under application conditions, as shown in FIG. 1B. A spacing/supporting structure 110 can be added during stacking of membrane sheets 102 as a separate component. A spacing/supporting structure 110 may be pre-built onto the membrane sheet 102. FIGS. 5A and 5B show two kinds of supporting structures 110 to keep the membrane sheets 102 apart when they are stacked up. One kind of supporting structure 110 comprises an array of evenly-spaced mini-beams, FIG. 5A. The flow channels 104, 106 are formed between the mini-beams. The beams direct the flow direction and path. The mini-beams may be made in various shapes in cross section. For example, a beam may be made in nearly rounded form to minimize blockage to the membrane surface. Or the beam may be made in square or rectangle form to minimize stagnant space in the flow channel. The mini-beam preferably has a height between 0.3 to 2.0 mm and a width (or diameter) between 0.2 to 2.0 mm. The spacing between the beams is preferably in a range of 1 to 50 mm. If the pressure difference between the process and sweep flows is small, such as less than 0.1 bar, large spacings can be used. If the pressure difference is significant, such as >1.0 bar, small spacing is preferred. The mini-beam may be printed on the membrane surface prior to the assembly, because of its small feature size. For a given membrane sheet 102, the mini-beam is preferably printed on only one surface, either on the $H_2O$-selective membrane surface or on the support surface.

Another kind of supporting structure comprises evenly-patterned mini-columns (FIG. 5B). The mini-column may be made in various shapes in cross-section, such as rectangle, square, hexagon, and rounded. The mini-column may have a height between 0.3 and 2 mm and a diameter (or width) between 0.2 and 2 mm. Spacing between the mini-columns is preferably over a range of 1 to 50 mm. This support structure 110 provides more open flow space and less-defined flow paths. The mini-columns may be printed on the membrane surface prior to the assembly, because of its small feature size. For a given membrane sheet 102, the mini-column is preferably printed on only one surface, either on the $H_2O$-selective membrane surface or on the support surface.

The material used to make the supporting structure 110 should be stable under the application conditions and not have any negative impact on the membrane performance. The candidate materials are stable polymers, metal oxides, ceramic, carbon, and metal as well the composite. Some adhesive may be added to have some bonding between the supporting structure and membrane sheet.

Figure 6B:
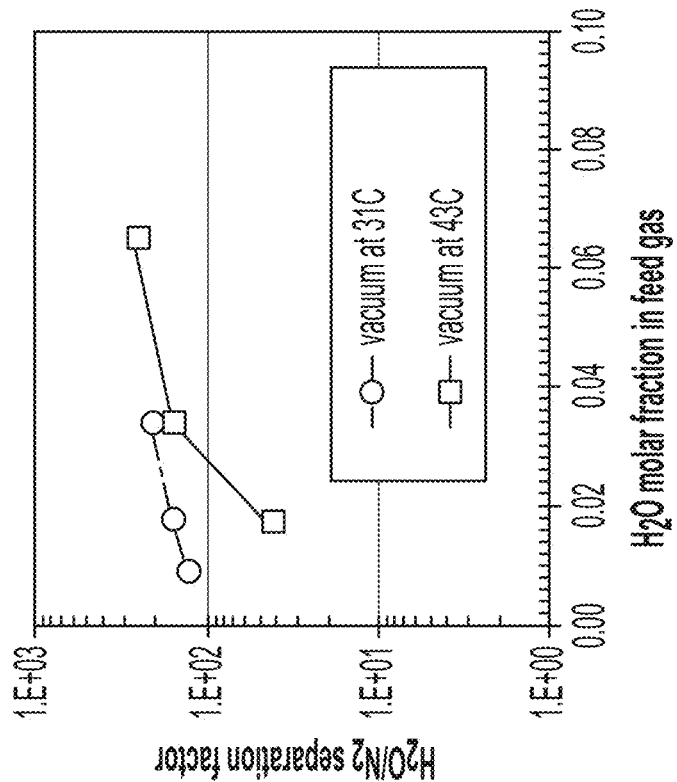
FIGS. 6A-6D are plots illustrating permeance and selectivity of a Nafion membrane.
Figure 6A:
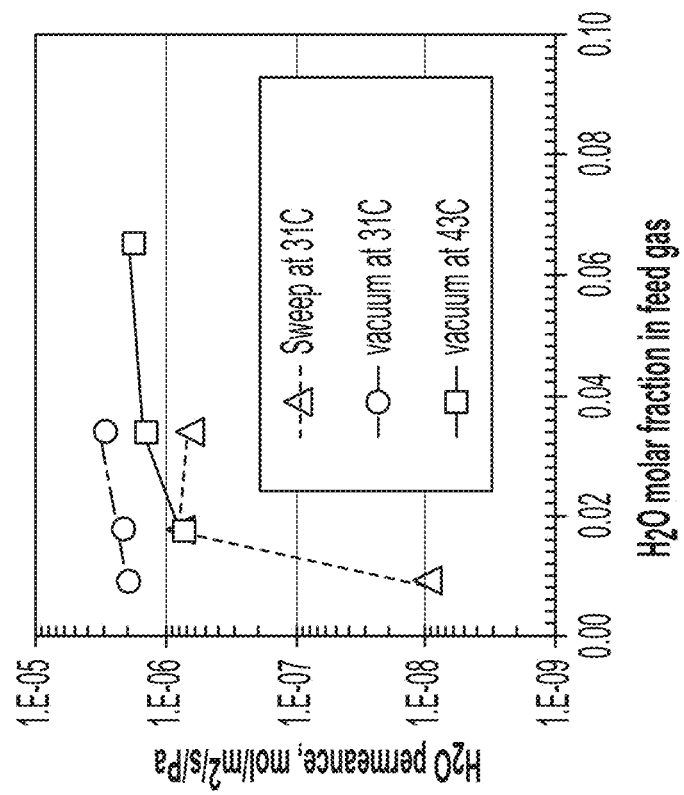

Example I. Comparative Tests of Nafion Membrane for $H_2O$ Permeance and Selectivity A commercial Nafion® 115 membrane sheet of thickness 0.005 inch is evaluated for water vapor/air separation over a range of conditions. A 2-cm diameter disk is punched out of the membrane sheet and loaded into a differential testing cell with silicon O-ring sealing. The membrane coupon is supported by a metal foam disk. A membrane area in the coupon of 12 mm diameter is exposed to the feed. Humid air is introduced into the membrane surface side under nearly atmospheric pressure. Two methods are evaluated to remove the permeated vapor. One method comprises sweeping the permeate side with a helium gas stream under atmospheric pressure, while another method comprises pulling vacuum to about 5-12 mbar. The permeated water vapor is collected and measured to calculate the water permeance. The permeated air is analyzed by on online Mass Spec analyzer. FIG. 6A shows that at a constant separation temperature of 31° C., consistently higher water permeance is obtained by pulling vacuum than sweeping. The water permeance is as low as $1 \times 10^{-8}$ mol/m²/s/Pa by sweeping. Thus, the membrane is mostly tested by pulling vacuum. Under a constant temperature, both water permeance (FIG. 6A) and $H_2O/N_2$ separation factor (FIG. 6B) increase with water molar fraction in feed gas. At 31° C., the water permeance and $H_2O/N_2$ separation factor range from about $2\text{-}3 \times 10^{-6}$ mol/m²/s/Pa and 120-200, respectively. As temperature is increased to 43° C., the water permeance and $H_2O/N_2$ separation factor decrease, which can be explained by decreased water content in the membrane. The increased water permeance with feed air humidity can be explained by increased water content in the membrane. The more the membrane swells, the more permeable the membrane becomes to water.

Figure 6D:
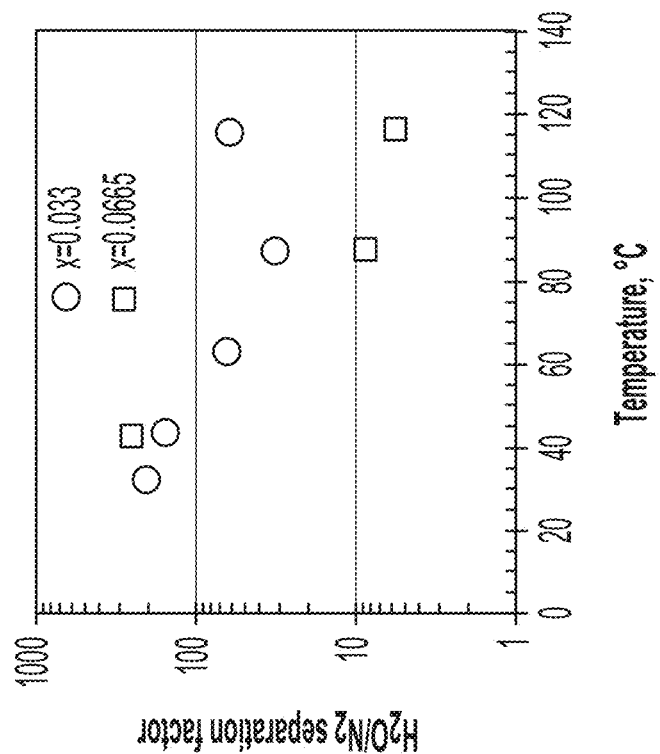
Figure 6C:
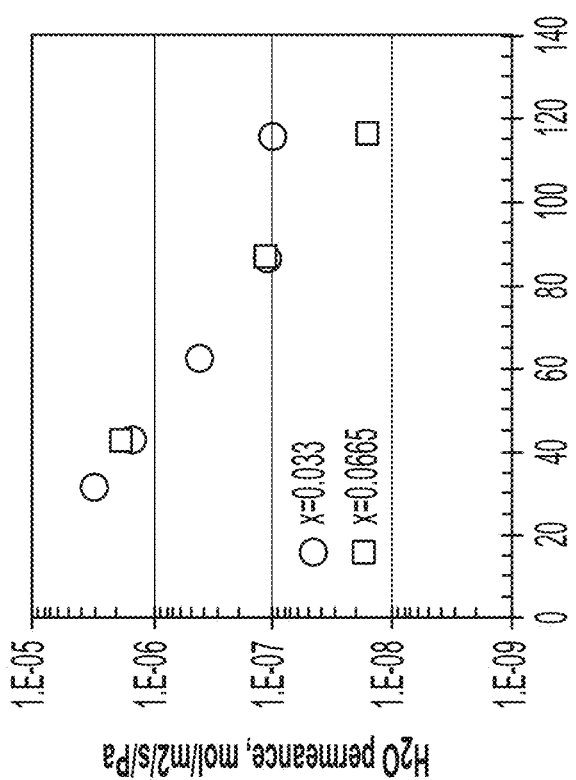

Sensitivity of the water permeance and $H_2O/N_2$ separation factor to temperature change is further shown by FIGS. 6C-6D. With a given molar fraction of water vapor in the feed air, both water permeance and $H_2O/N_2$ separation factor drastically decrease with increasing temperature. This is explained by decreased water content in the membrane. Increasing water molar fraction from 0.033 to 0.0665 does not affect the trend, indicating that temperature has larger degree of impact on the hydration level of the Nafion membrane than water vapor content. These testing results reveal the sensitivity of the Nafion membrane performance to the operating conditions.

Example II Thin Water-Selective Molecular Sieve Membrane Sheet

Thin molecular sieve membrane sheets 102 are illustrated with a NaA-type zeolite membrane 102 grown on a porous metal sheet support 116 in FIG. 7. The support sheet 116 has a thickness of about 50 μm. After zeolite membrane 102 growth, the membrane sheet 102 has an average thickness about 55 μm. The zeolite membrane layer 102 is so thin that the membrane sheet 102 has the same mechanical rigidity and flexibility as the porous metal sheet 116. It is rigid enough to stay flat by holding one or two ends (FIG. 7A). It is flexible enough to be bent and wrapped onto a ½" OD tube (FIG. 7B). The membrane structure is revealed by cross-sectional view (FIG. 7C). A dense zeolite membrane layer 102 of a few micrometer thickness is grown on the porous metal support 116. The zeolite crystals are visible by looking at the membrane surface under scanning electron microscopy (SEM) (FIG. 7D). The membrane surface comprises inter-grown zeolite crystals without any holes or cracks.

Figure 8A:
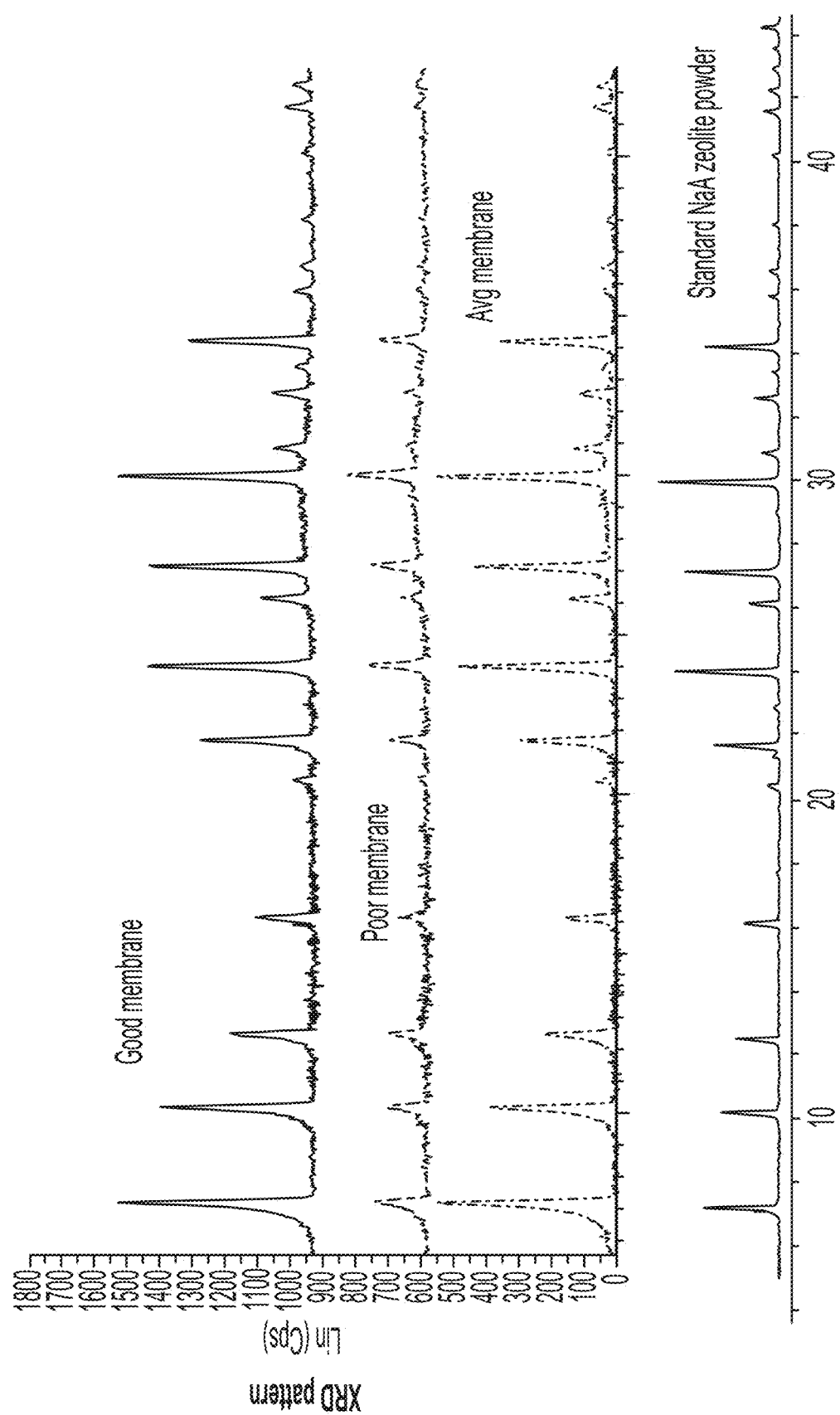
FIG. 8A is an X-ray diffraction (XRD) plot comparing membrane embodiments.
Figure 8B:
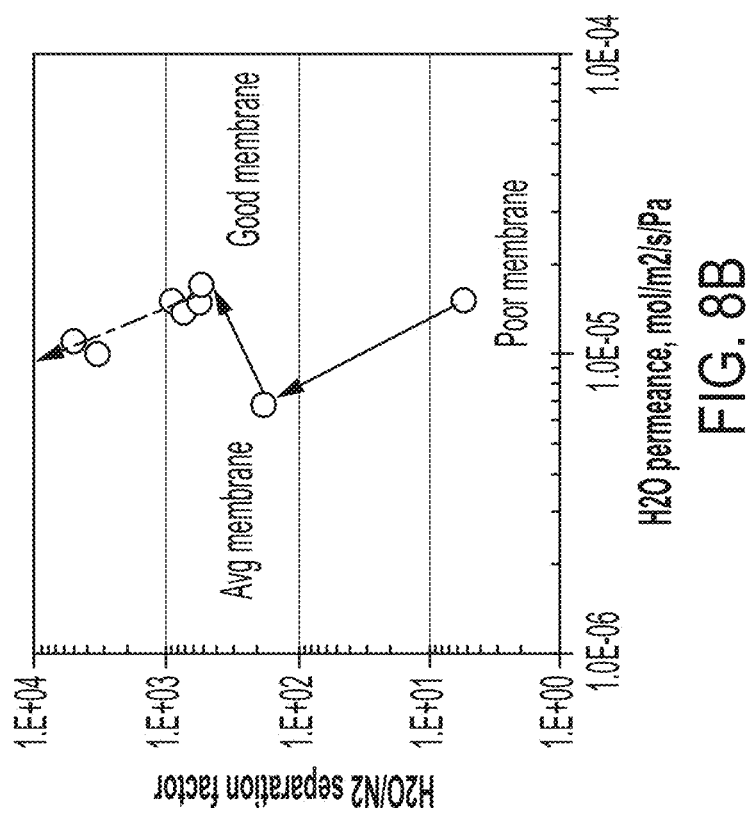
FIG. 8B is a plot comparing $H_2O/N_2$ separation factor and $H_2O$ permeance of various membrane embodiments.

Crystal phases of the membrane can be identified by X-ray diffraction analysis, FIG. 8A. FIG. 8A shows that XRD patterns of three zeolite membrane samples match well with standard NaA zeolite powder. The NaA crystal lattice framework is confirmed. The XRD pattern can be indicative to quality of the membrane 102. A zeolite membrane 102 of poor quality has weak XRD peaks, while quality zeolite membranes 102 comprising pure zeolite crystal phases exhibit clearly-identifiable XRD peaks. There is qualitative correlation between the zeolite membrane crystal quality with air dehumidification performances. The air dehumidification performances shown in FIG. 8B are measured using the test cell as described in the above example. Humid air of 32° C. and 80% RH is introduced into feed side of the test cell under atmospheric pressure, while the permeate side is pulled in vacuum. The membrane 102 of poor quality shows high $H_2O$ permeance but a low $H_2O/N_2$ separation factor. With the membrane 102 of average quality, the separation factor is increased by nearly two orders of magnitude but with slight decrease in $H_2O$ permeance. The membrane 102 with good quality provides both high $H_2O$ permeance and high $H_2O/N_2$ separation factor. These results show unique performance characteristics of a zeolite membrane 102 that permeance and selectivity are largely affected by quality of the membrane 102 prepared, and there is no necessary tradeoff between the permeance and selectivity. This performance characteristics results from molecular-sieving separation mechanism of the zeolite membrane 102, which is different from the solute-diffusion mechanism associated with most polymeric or fluid-type membrane materials.

Example III $H_2O$-Molecular Specificity of the Zeolite Membrane Sheet

Selective $H_2O$ permeation of the NaA-type zeolite membrane sheet 102 over other molecules is characterized by conducting gas separation tests with different feed gas mixtures. The permeance and selectivity are measured with the differential test cell as described in example I. The feed gas is introduced to contact with the zeolite membrane surface under atmospheric pressure, while the permeate is pulled out of the porous metal support sheet by vacuum at pressures of 1 to 10 mbar. FIG. 9 shows $H_2O$ permeance and selectivity with a humidified feed gas consisting of 85 mol % $CH_4$, 10% mol $CO_2$, and 5% mol $N_2$. With constant water molar fraction of 0.025 in the feed gas (FIG. 9A), $H_2O$ permeance slightly increases with temperature, while $H_2O$ selectivity to $CO_2$, $CH_4$, and $N_2$ decreases with temperature. The $H_2O/CO_2$ and $H_2O/CH_4$ selectivity is one order of magnitude higher than the $H_2O/N_2$ selectivity. The $H_2O/CO_2$ and $H_2O/CH_4$ selectivity is 1000 to 200 over the temperature range of 20 to 40° C. tested. With constant separation temperature of 32° C. (FIG. 9B), $H_2O$ permeance slightly increases with feed $H_2O$ molar fraction, while the $H_2O$ selectivity to $CH_4$, $CO_2$, and $N_2$ increases with feed water molar fraction. The impact of temperature and feed $H_2O$ molar fraction on selectivity are attributed to the amount of $H_2O$ adsorbed inside the zeolite pores 112. The more $H_2O$ is adsorbed inside the zeolite pores 112 at low temperature and high feed water content, the less the fraction of the pore space is left for other molecules to permeate. $CH_4$ is the smallest hydrocarbon molecule. It is expected that the selectivity of $H_2O$ to other hydrocarbon molecules with this membrane 102 may be greater than $H_2O/CH_4$ selectivity.

Figure 10:
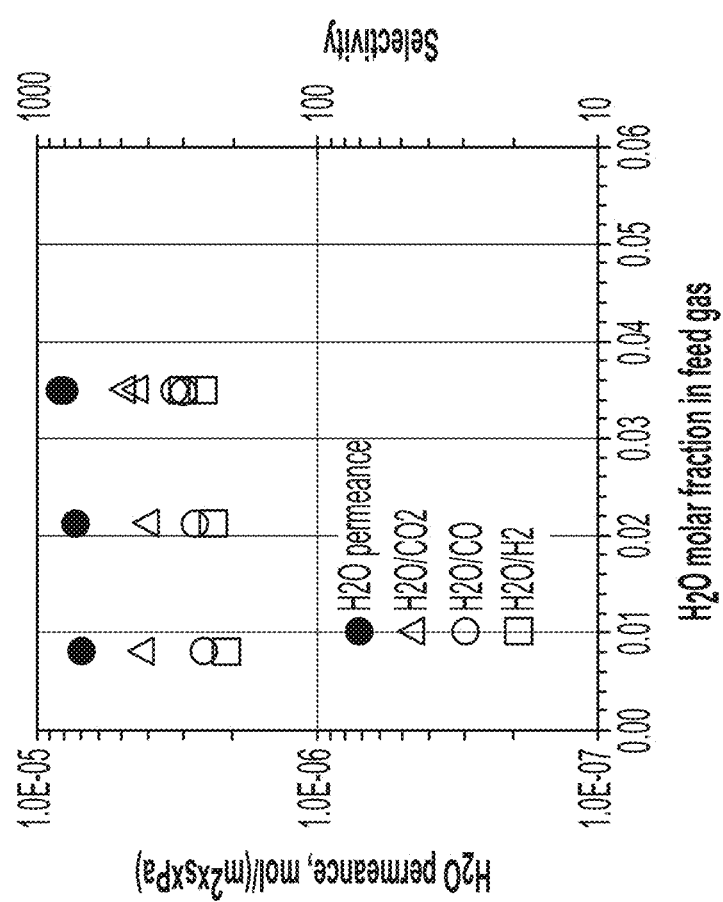
FIG. 10 is a plot of the $H_2O$ permeance and selectivity over $CO_2$ CO and $H_2$ versus $H_2O$ molar fraction.

Selective $H_2O$ permeation over syngas is measured on another NaA/metal sheet membrane coupon 102 using a humidified syngas mixture consisting of 30% mol CO, 35% mol $CO_2$, and 35% mol $H_2$. FIG. 10 shows that with constant separation temperature of 32° C., $H_2O$ permeance slightly increases with feed water molar fraction, and its selectivity to $CO_2$, CO, and $H_2$ also increases with feed water molar fraction. $H_2O/CO_2$ selectivity is greater than $H_2O/CO$ and $H_2O/H_2$ selectivity. The $H_2O/H_2$ selectivity ranges from 200 to 300 under the conditions tested. $H_2$ is a smaller molecule than $H_2O$ and has very high gas permeability. Its permeation through the zeolite membrane 102 is blocked by adsorbed $H_2O$.

Figures 11A, 11B:
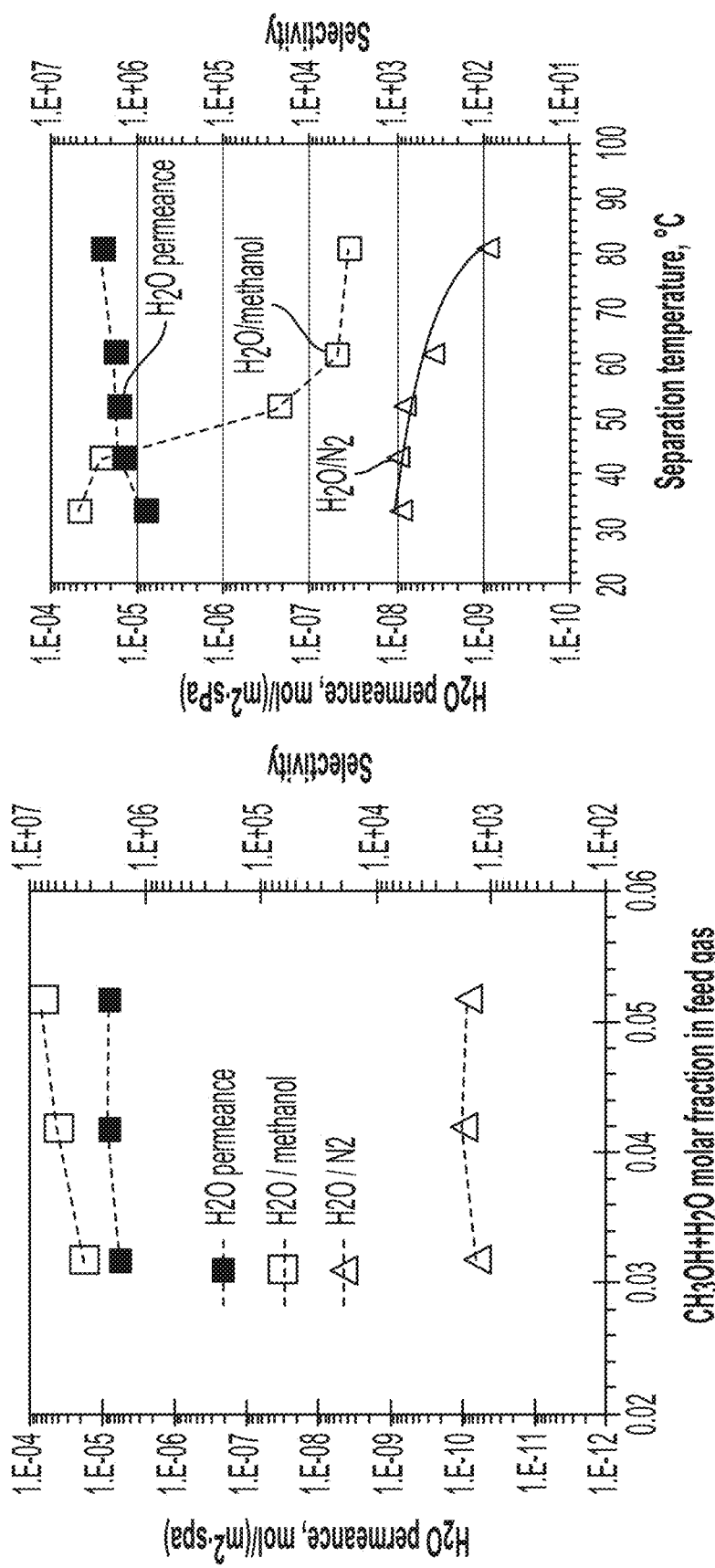
FIG. 11A is a plot of the $H_2O$ permeance and selectivity over methanol and $N_2$ versus methanol+water mole fraction.
FIG. 11B is a plot of the $H_2O$ permeance and selectivity over methanol and $N_2$ versus temperature.

Selective $H_2O$ permeation over methanol is tested on a new NaA/metal sheet membrane coupon 102 using an air stream laden with methanol and water. Water and methanol are added into the feed air at a molar ratio of 1:1. With a constant separation temperature of 32.8° C., FIG. 11A shows that $H_2O$ permeance is nearly constant over the range of feed $H_2O$+methanol molar fraction tested. The membrane 102 shows extremely high selectivity toward $H_2O$ over methanol. The selectivity is in the order of $10^6$ to $10^7$. With a constant feed air of $H_2O$+methanol molar fraction=0.052 (FIG. 11B), $H_2O$ permeance slightly increases as the temperature is raised from 32 to 85° C. The $H_2O$/methanol selectivity suddenly drops as the temperature is lowered from 45 to 55° C. but remains in the order of $10^3$ to $10^4$—very high. The $H_2O/N_2$ selectivity is $10^2$ to $10^3$ over the temperature range tested. Methanol represents a small molecule among commonly-used solvents. Higher $H_2O$ selectivity over other organic solvents of larger sizes is expected.

Example IV Humidity Exchange Through the Thin Zeolite Membrane Sheet in a Counter-Current Test Cell A thin NaA/metal membrane sheet 118 is cut into a 40 mm×110 mm coupon and loaded into an integral test cell made of stainless steel. The membrane sheet 118 is supported by stainless steel beams 110 of 92.4 mm long×0.3 mm wide×1.5 mm high spaced evenly at 3.5 mm span. The ratio of the solid support 110 to the membrane sheet 118 area is 0.068, i.e., the open membrane area (OMA) fraction is 0.932. The open frontal area (OFA) fraction for air flow is 0.92, i.e., the fraction of cross-sectional area for air to flow is 92% of the total cross-sectional area. The air flow channels 104, 106 comprise 11 of 3.5 mm (wide)×1.5 mm (height) straight channels 104, 106. The hydraulic diameter is 2.1 mm. A humid air flow (process 1) is introduced into the test cell from one end of the membrane sheet 118, contacts with the zeolite membrane surface, and exits from the other end of the membrane sheet 118. A sweep dry air flow (sweep 2) at the same flow rate as the process 1 is introduced from the back side of the membrane sheet 118 and flows over the membrane sheet 118 in the opposite direction to the process flow 1. Both the process and sweep flows are maintained under atmospheric pressure. The humidity exchanges between the two air streams are measured to calculate global $H_2O$ permeance.

Figure 12A:
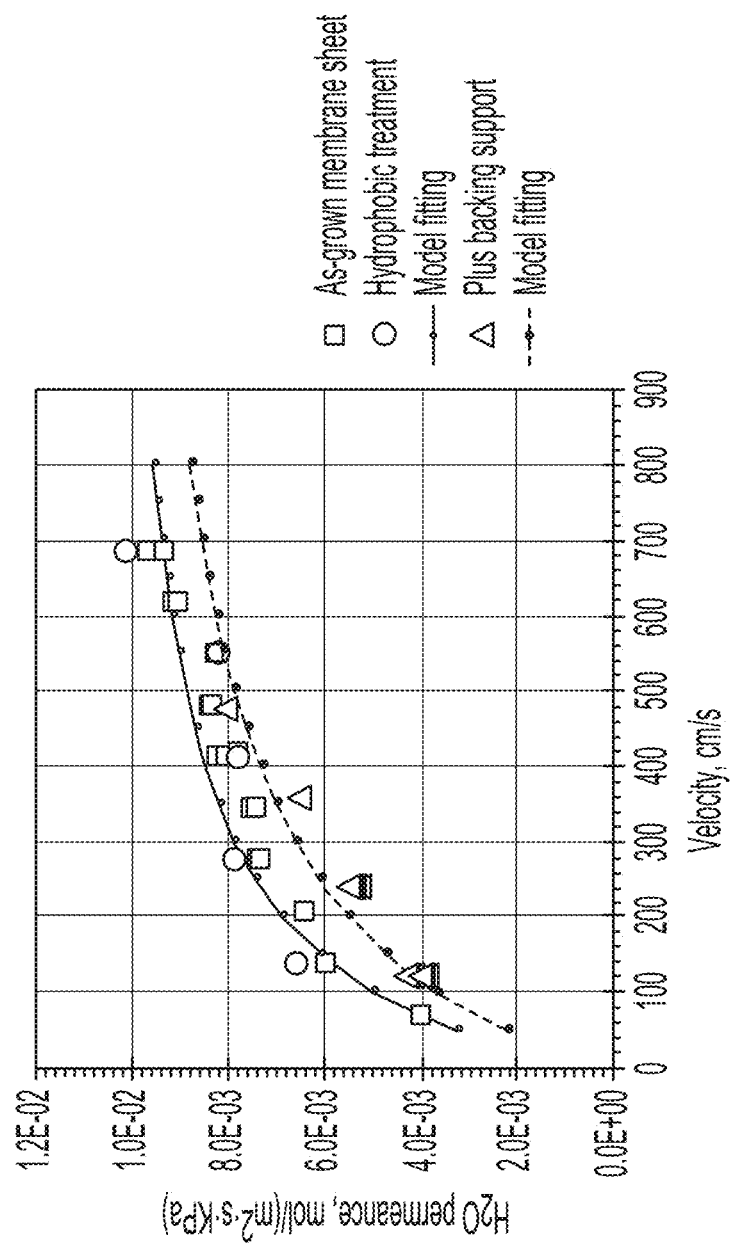
FIG. 12A is a plot of the $H_2O$ permeance versus air velocity through a NaA/metal sheet membrane according to an embodiment.

Air velocity was found to impact the global $H_2O$ permeance (FIG. 12A). For this group of experiments, the process flow 1 is 296.4K and RH 74.6% at its introduction point, and the sweep flow 2 is 297.9K and RH 10.1% at its introduction point. The as-grown thin zeolite membrane sheet 102 is tested first. Then, the as-grown zeolite membrane 102 is modified by silanizing the surface hydroxyl groups of the membrane sheet 102 so that the membrane 102 becomes hydrophobic. On the as-grown zeolite membrane 102, a water droplet is immediately spread over the membrane surface upon its contact with the surface. By contrast, the water droplet remains as droplet on the membrane surface after hydrophobic modification. In a third configuration, 0.2 mm-thick woven polyester meshes are placed on the two sides of the as-grown zeolite membrane sheet 102 to serve as a lining between the membrane sheets 102 and the supporting beams 110. The water permeance measured with the as-grown zeolite membrane 102 is about the same as that measured with the hydrophobic-modified membrane 102. The results confirm a molecular separation and transport mechanism of the zeolite membrane 102. Water vapor in air diffuses onto the membrane surface and adsorbs into the zeolite pores 112, which is not affected if the zeolite membrane surface is hydrophobic or hydrophilic relative to water droplets. However, addition of the polyester linings lowers the $H_2O$ permeance significantly over the whole range of air velocity tested. The water permeance decrease is attributed to increased diffusion resistance. With highly-permeable zeolite membranes 102, diffusion length between the bulk flow and the membrane surface should be as small as possible.

The three sets of measurements show a common trend that the water permeance rapidly increases with air velocity and reaches a plateau. The trend can be described by the following equation:

$$P = \frac{P_m}{1+\left(\frac{a}{V}\right)^b}$$

The parameters obtained from regression of the experimental data are listed in Table 1. $P_m$ represents intrinsic membrane permeance. Parameters a and b characterize the diffusion resistance. Addition of the polyester lining increases the diffusion resistance parameter a from 120 to 200 cm/s. The testing results of this example highlight that it is desirable to have a sufficiently high air velocity and to minimize the diffusion layer thickness when using highly-permeable zeolite membrane sheets 102 in a humidity exchange device.

TABLE 1

Parameters regressed from experimental data for counter-current humidity exchange in 1.5 mm high × 3.5 mm wide air flow channels

| | As-grown zeolite membrane sheet | After hydrophobic modification | Addition of 0.2 mm-thick polyester lining |
|---|---|---|---|
| $P_m$, mol/(m² · s · Pa) Parameter | 1.1E−05 | 1.1E−05 | 1.1E−05 |
| a, cm/s | 120 | 120 | 200 |
| b | 1 | 1 | 1 |

Figure 12B:
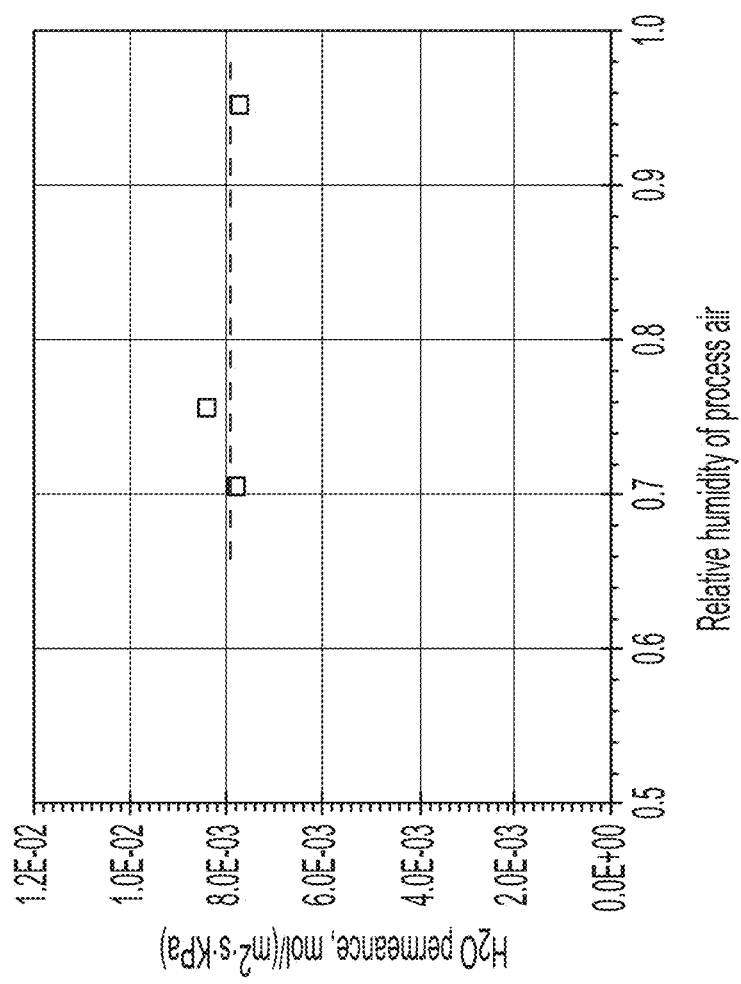
FIG. 12B is a plot of the $H_2O$ permeance versus relative humidity of process air through a NaA/metal sheet membrane according to an embodiment.

The air velocity should be maintained above predetermined value to effectively utilize the high permeance of the zeolite membrane sheet 102. FIG. 12B shows water permeance measured at three different humidity levels of incoming process flow 1, while the humidity of incoming sweep flow 2 is maintained at 11%. The water permeance is at about $8\times10^{-6}$ mol/m²/s/Pa over the range of the humidity level measured, indicating the robustness of the zeolite membrane 102 to process conditions.

Example V Humidity Exchange and Heat Exchange with the Thin Zeolite Membrane Sheet A counter-current test cell was built with plastic frames and plastic cover plates to conduct both humidity and thermal exchange. The low thermal conductivity of the plastic material thermally insulates the gas flows such that the heat exchange between two sides of the membrane sheet 102 is the major thermal energy transport process, rather than heat exchange with environment. A NaA/metal membrane sheet 118 of 40 mm×100 mm working area is fixed in the device 100 to have an air flow channel height of 0.5 mm on two sides of the membrane 118. Hot and humid air is introduced from the membrane surface side as process flow 1, while a relatively cold and dry air is introduced from the back side of the membrane sheet 118 as sweep flow 2. The two air streams flow in opposite directions inside the test cell. The air flow is introduced and collected at three locations, evenly spaced along 100 mm-channel width to make a uniform air flow distribution through the channel of 0.5 mm height×100 mm width×40 mm length. The hydraulic diameter of the air flow channel is 1.0 mm. In this cell configuration, the open-membrane area (OMA) fraction is 100% and open front area (OFA) fraction is also 100%. The thin zeolite membrane sheet 102 has sufficient rigidity to stay flat over such a large working area (40 cm²).

Figure 13B:
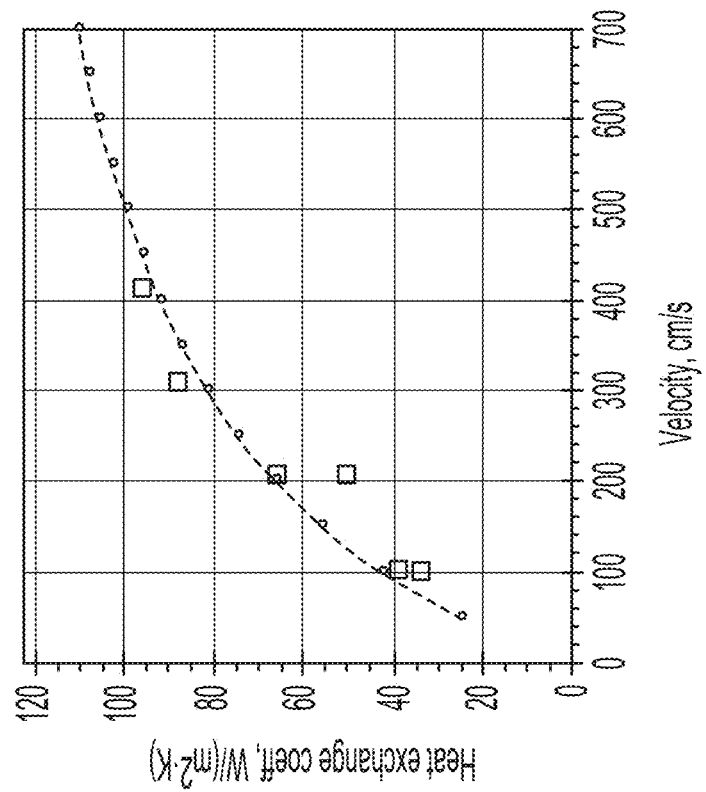
FIG. 13B is a plot of the heat exchange coefficient versus air velocity through a NaA/metal sheet membrane according to another embodiment.
Figure 13A:
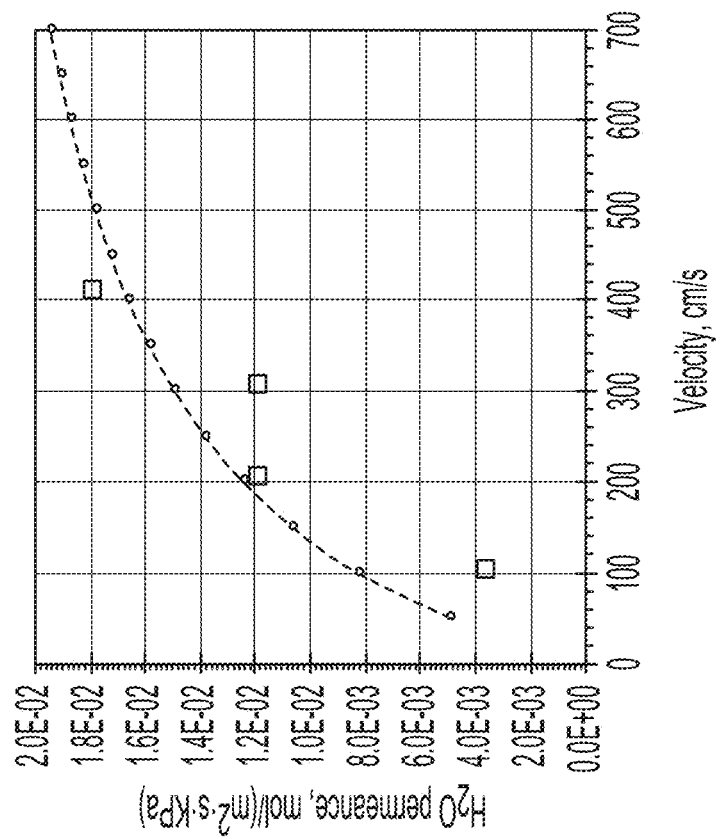
FIG. 13A is a plot of the $H_2O$ permeance versus air velocity through a NaA/metal sheet membrane according to another embodiment.

The global $H_2O$ permeance and the heat exchange coefficient were measured with the test cell and are plotted in FIGS. 13A and 13B. For this group of tests, the process flow 1 has a temperature about 301K and water vapor molar fraction of 0.01, and the sweep flow 2 has temperature about 295K and water molar fraction about zero. Both air flows are at atmospheric pressure and have the same flow rate. Both the water permeance and the heat exchange coefficient increase rapidly with air velocity and reach a plateau. The water permeance variation can be described by the above equation. The heat exchange coefficient variance can be described with the similar equation as follows:

$$U = \frac{U_m}{1+\left(\frac{a}{V}\right)^b}$$

The resulting parameters are listed in Table 2. Such a dependence highlights the effect of air velocity on the permeance and the heat exchange coefficient with a membrane device of both high water permeance and heat transfer coefficient. Table 2 shows that at sufficiently high air velocity, the membrane permeance and heat exchange coefficient can approach as high as $2.5\times10^{-5}$ mol/m²/s/Pa and 150 W/(m·k), respectively.

TABLE 2

Parameters regressed from experimental data of counter-current humidity and heat exchanger in 0.5 mm high × 100 mm wide air flow channels

| Humidity exchange | | Heat exchange | |
|---|---|---|---|
| $P_m$, mol/(m² · s · Pa) Parameter | 2.5E−05 | U, W/(m · K) Parameter | 1.50E+02 |
| a, cm/s | 200 | a, cm/s | 250 |
| b | 1 | b | 1 |

Figure 14B:
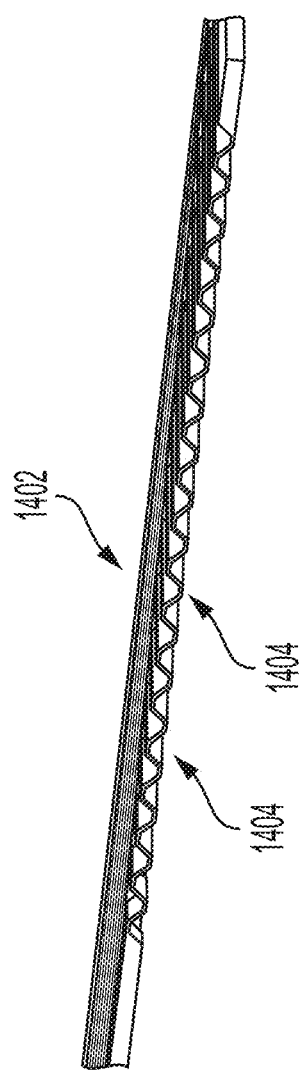
FIG. 14B is a perspective drawing illustrating details of the frame of FIG. 14A.
Figure 14A:
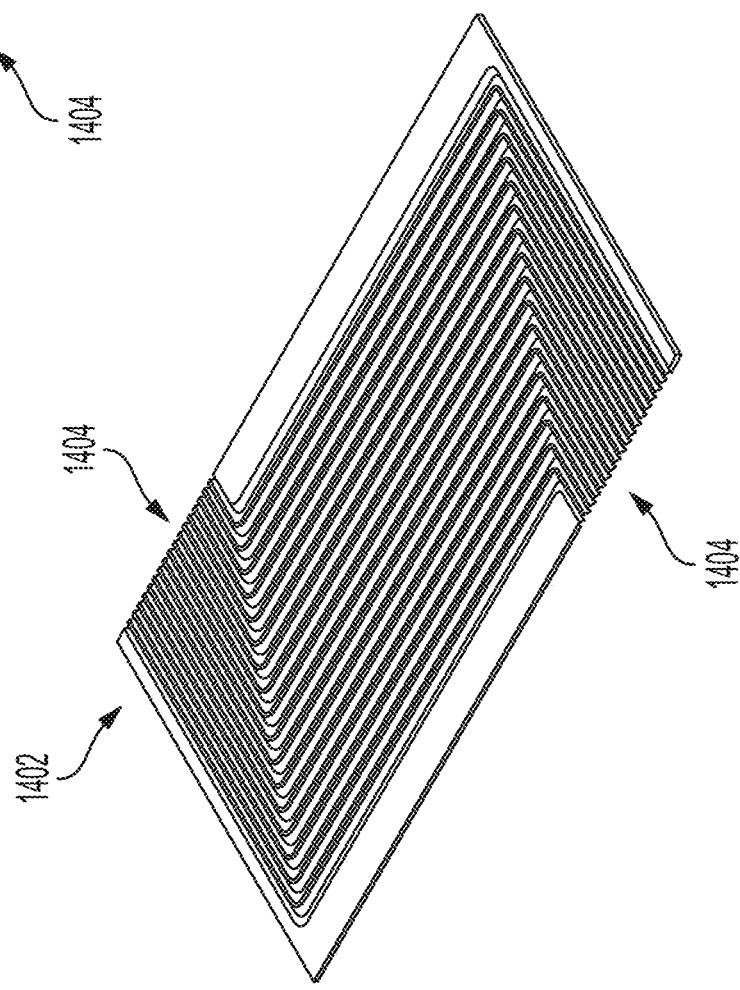
FIG. 14A is a perspective drawing of a frame with evenly spaced flow channels according to an embodiment.

Example VI. Counter-Current Device Configuration with 90-Degree Turn of Flow Direction This example shows a design and assembly method of a counter-current exchange device 1400 with 90-degree turns of flow direction. FIG. 14A shows a plate-type frame 1402 with patterned flow channels 1404. The patterned flow channels 1404 move from the lower left edge of the frame, make 90-degree left turn, move along longitudinal direction of the plate, make 90-degree right turn, and come out of the upper right edge of the frame 1402. FIG. 14B gives a cross-sectional view of the patterned flow channels 1404 on the edge. The waved channels 1404 allow the fluid to flow on both sides of the plate 1402. Furthermore, an array of holes (not shown) can be made on the channel wall to connect the flows on the two sides of the plate. The preferred channel height (or amplitude) and wavelength are 0.5 to 2.0 mm and 1.0 to 40 mm, respectively. The channel wall thickness is preferably 0.1 to 0.5 mm. The frame 1402 can be made of polymer, metal, glass, ceramic, composite or hybrid materials. Injection molding, machining or stamping material processing methods can be used to make such a simple frame 1402 at low cost.

Figure 15:
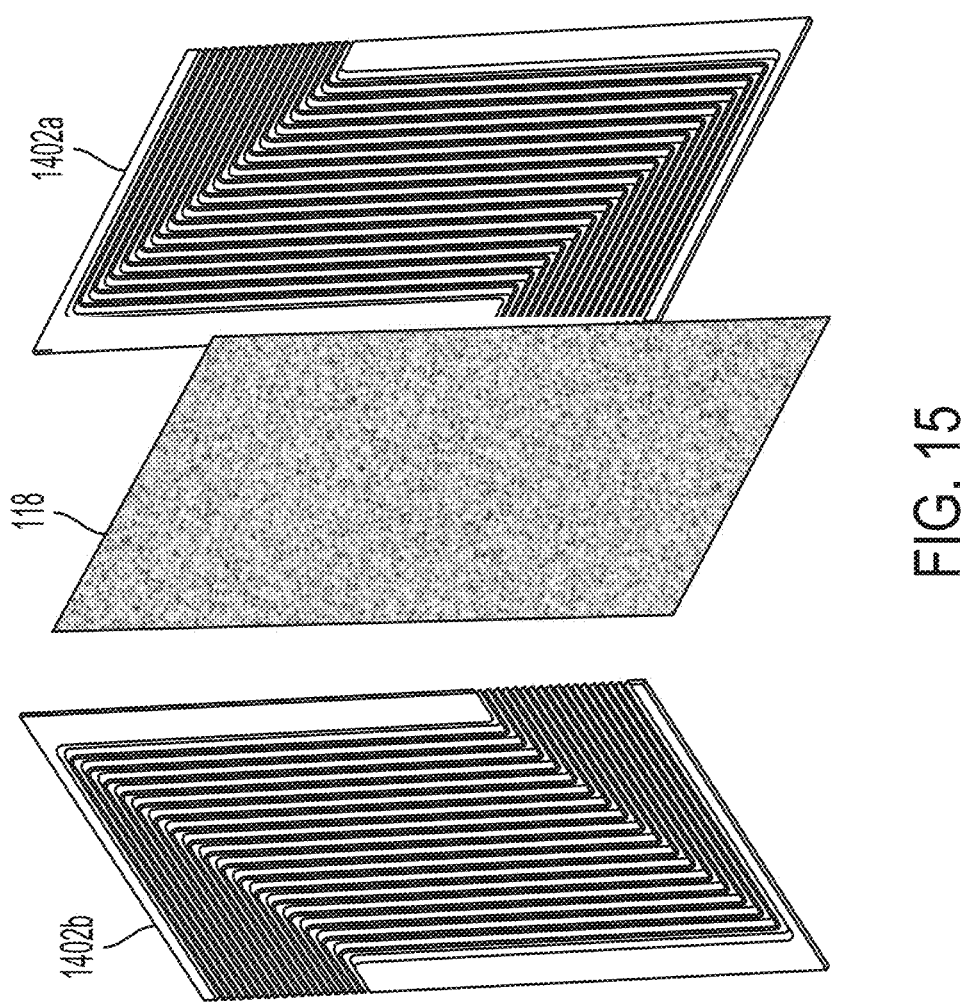
FIG. 15 is an exploded view of a water molecule-selective molecular sieve membrane module according to an embodiment.
Figure 16:
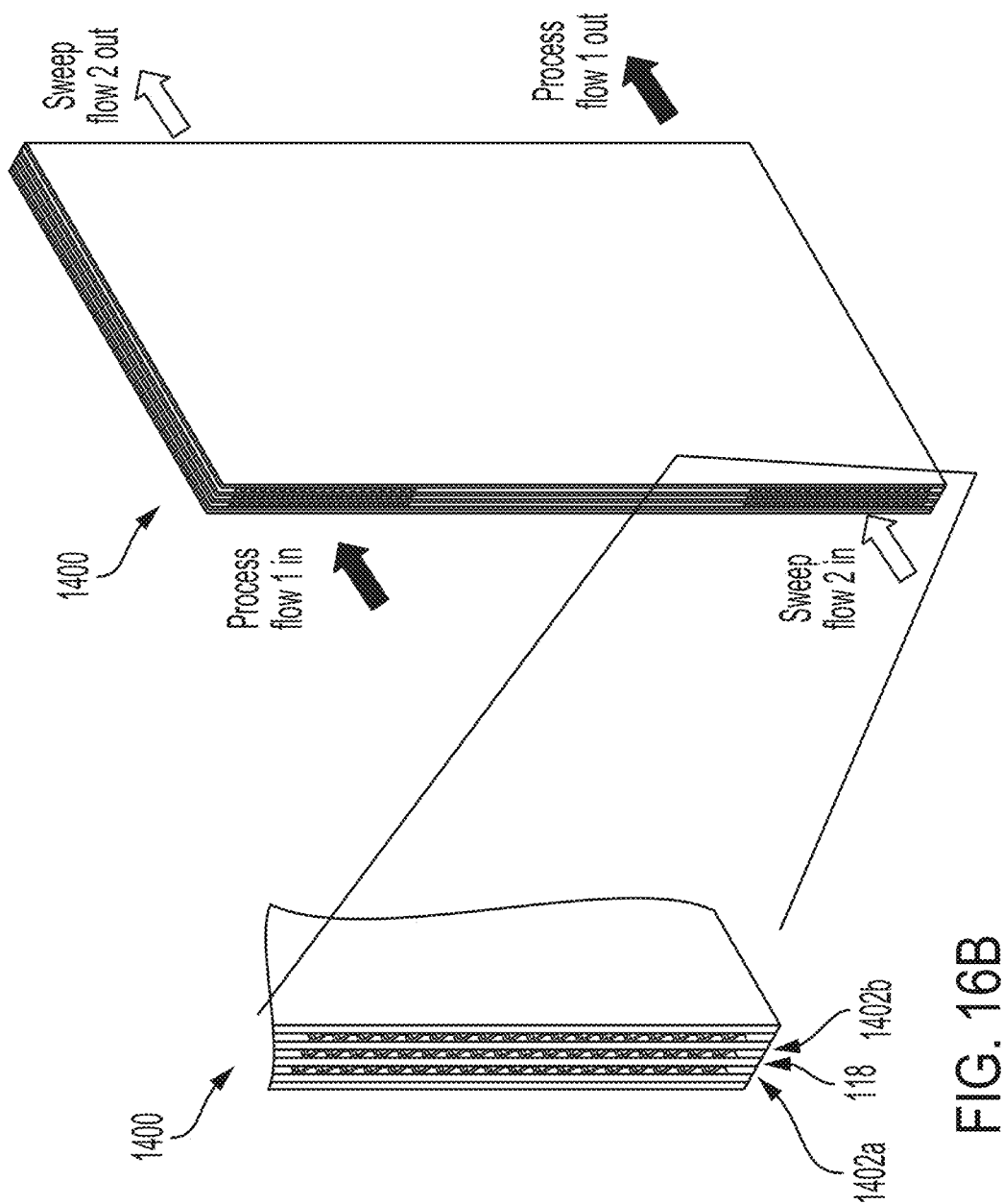
FIG. 16A is a perspective view of a water molecule-selective molecular sieve membrane module assembled according to FIG. 15.
FIG. 16B is a closeup view of a portion of FIG. 16A.

The thin membrane sheets 118 can be packaged into a counter-current module by use of the above frame 1402. As illustrated in FIG. 15, a membrane sheet 118 is bonded onto a frame of channel orientation from lower left to upper right 1402a. Then, a frame of channel orientation from upper left to lower right 1402b is bonded onto the membrane sheet 118. The membrane sheet 118 and frame 1402a/1402b can be stacked one by one to reach the desired layers of the thickness. The resulting module 1400 is shown in FIGS. 16A and 16B. This module 1400 enables process flow 1 and sweep flow 2 to exchange water molecule and/or temperature in a counter-current flow regime. Two manifolds (not shown) are connected to a side surface of the module 1400 to introduce respective process and sweep flows. Two other manifolds (not shown) are connected opposite surface of the module 1400 to discharge respective sweep and process flows.

Example VII. Counter-Current Exchanger with 120 Degree of Flow Direction Turns

Figure 17:
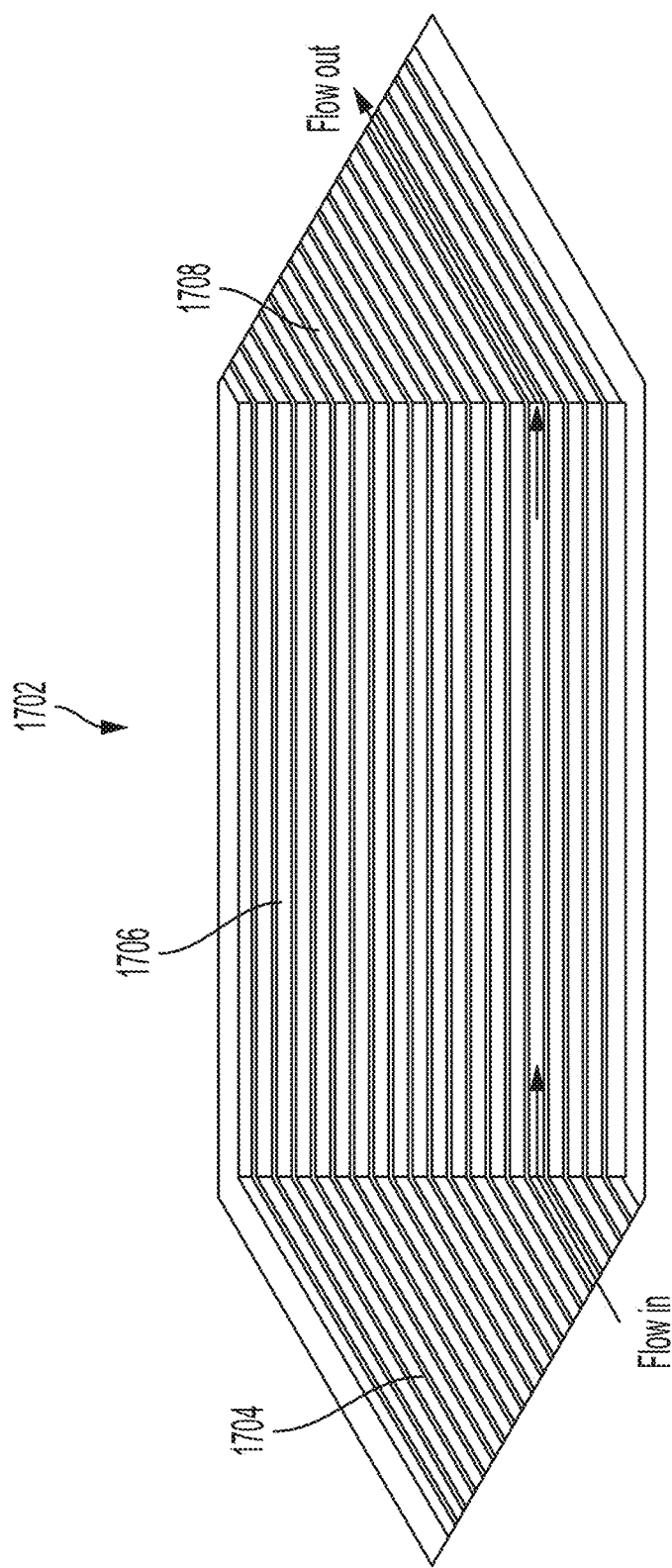
FIG. 17 is a schematic view of a pattern frame with 120-degree flow direction turns according to an embodiment.

The 90-degree turn can increase pressure drop. For applications requiring smaller pressure drops, a device 1700 having a different design with smoother flow direction changes is illustrated in FIG. 17. A plate-type frame 1702 comprises three sections: inlet section 1704, main body 1706 and an outlet section 1708. In the inlet and outlet sections 1704, 1706, the flow channels are supported by a solid bottom, while in the main body, flow channels are open in front and back. In the inlet section 1704, the channel width and channel height are preferably 0.5 to 20.0 mm and 0.3 to 1.5 mm, respectively. The solid bottom thickness is preferably 0.05 to 0.5 mm. The flow channels of the outlet section 1708 are parallel to the flow channels of the inlet section 1704 and have the same dimensions as the flow channels of the inlet section 1704. The open frontal area (OFA) fraction for flow is preferably greater than 0.5. In an embodiment, the channel width is kept the same from inlet section 1704, main body 1706, to outlet section 1708. The plate thickness is uniform throughout the plate. Thus, the channel height in the main body would be sum of the solid bottom thickness and channel height in the inlet section. This type of plate provides 120 degree turns for flow to move from inlet to outlet.

Figure 18:
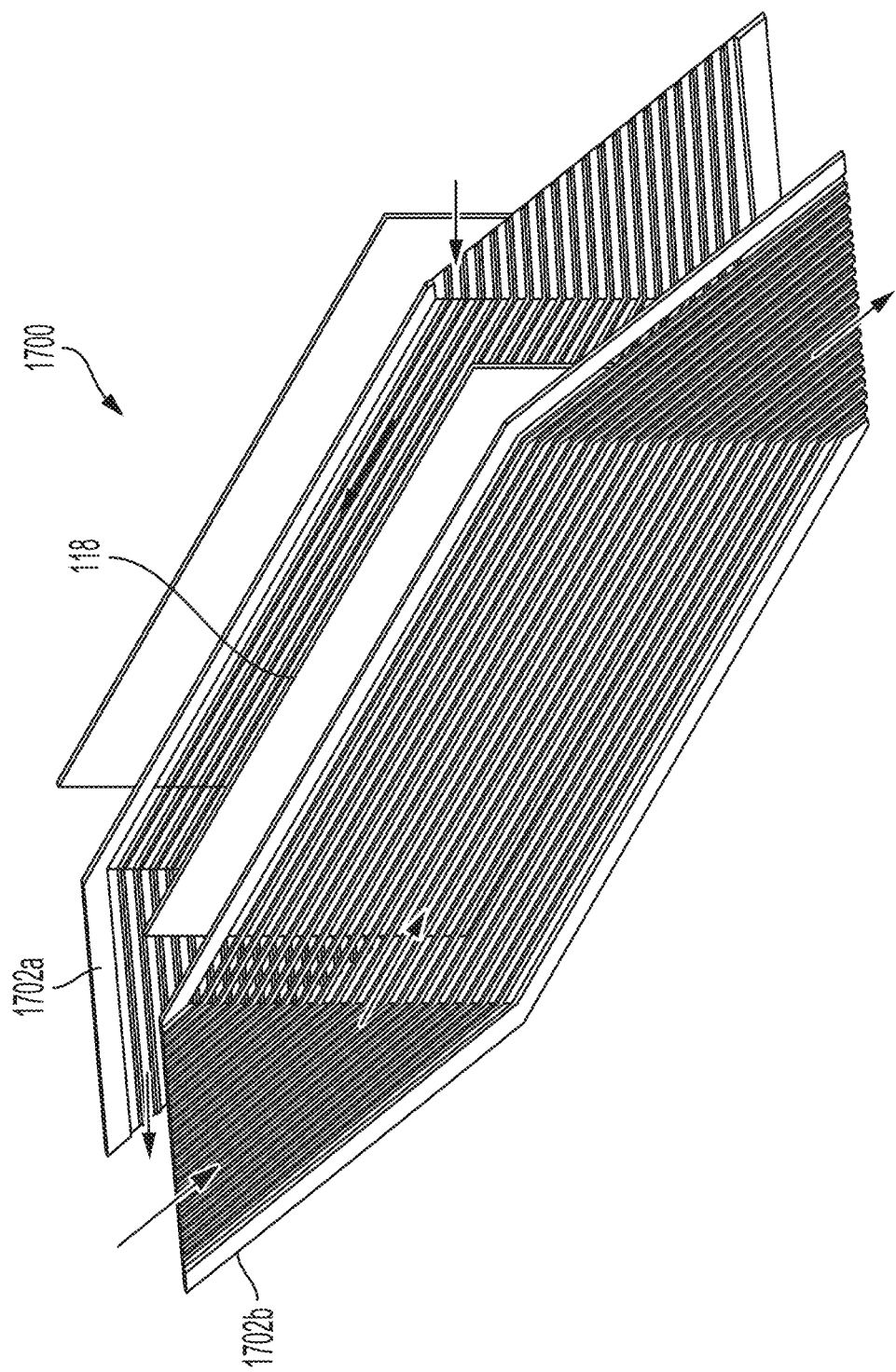
FIG. 18 is an exploded view of a water molecule-selective molecular sieve membrane module using the frame of FIG. 17.
Figures 19A, 19B:
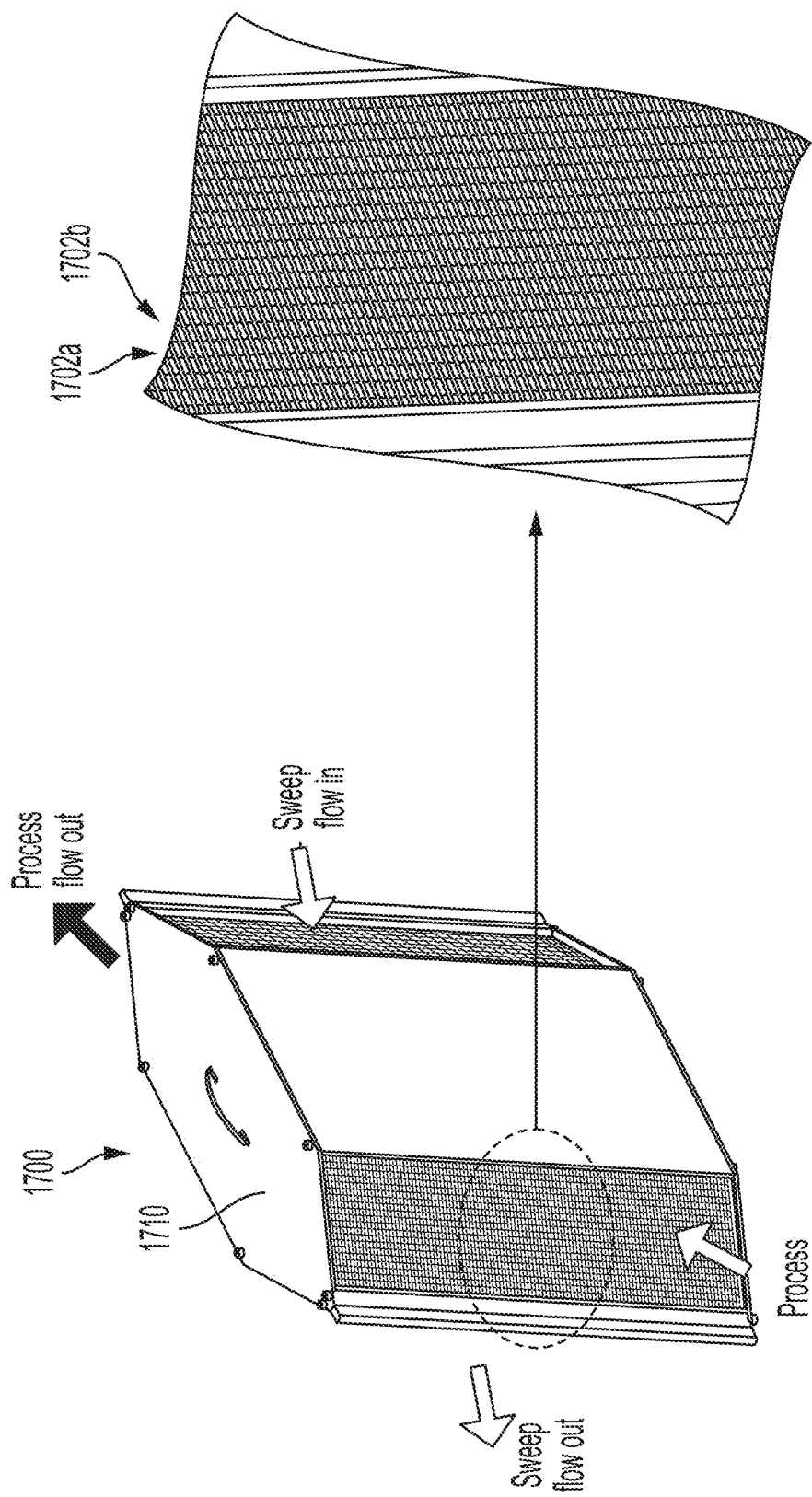
FIG. 19A is a perspective view of membrane module core designed for countercurrent flow.
FIG. 19B is a closeup view of a portion of FIG. 19A.

The frame plate 1702 is used to package thin membrane sheets 118 into a module 1700. As shown in FIG. 18, a thin membrane sheet 118 is bonded onto right-handed frame 1702b and a left-handed frame 1702a is bonded onto the membrane sheet 118. The frames 1702a/1702b and membrane sheet 118 are stacked one by one to reach desired stacking thickness. The resulting module core 1700 is shown in FIGS. 19A and 19B. Two manifolds (not shown) can be attached on the front and back ends of the module core 1700 on right side to introduce respective process and sweep flow into the module 1700. Two other manifolds (not shown) can be installed on front and back end of the module core 1700 on left side to discharge respective sweep and process flows.

Figure 20B:
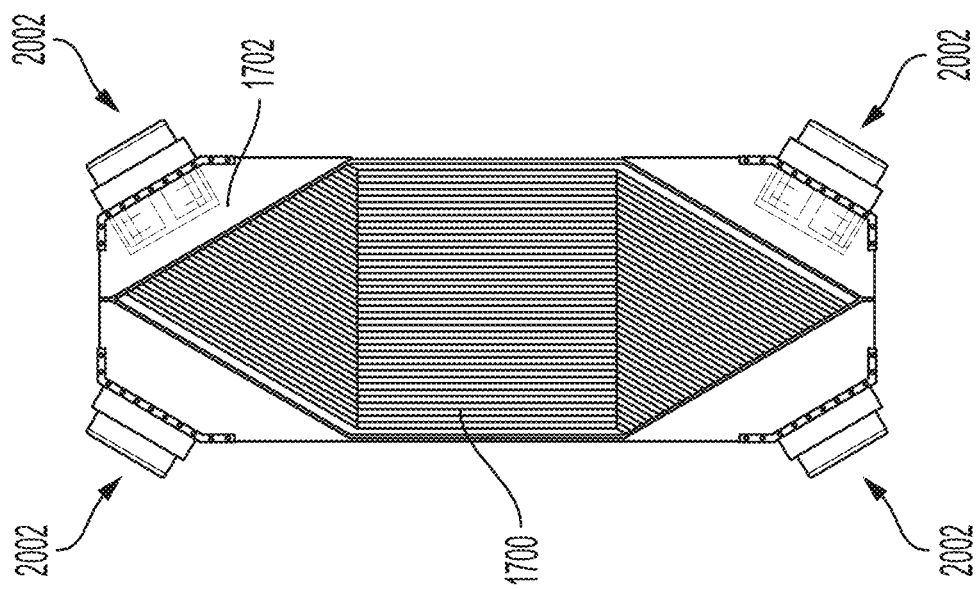
FIG. 20B is a schematic view of the inside of the cased membrane core of FIG. 20A.
Figure 20A:
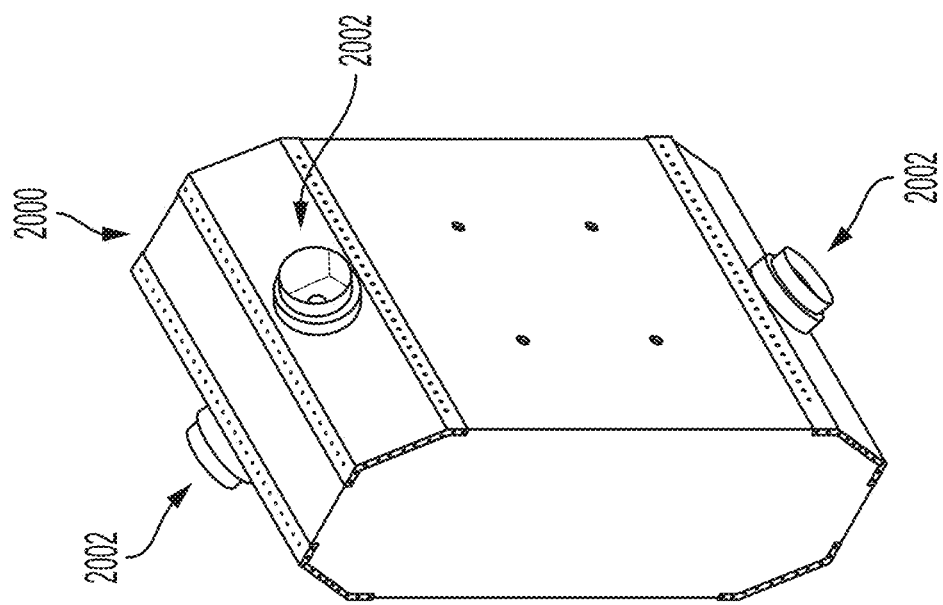
FIG. 20A is a perspective view of a cased membrane core according to an embodiment.

The membrane module core 1700 can be cased inside a vessel 2000 to make connections to all the flows. FIG. 20 shows an example of symmetrical casing design of the vessel 2000. Flow ducts or pipes can be connected to the outlets 2002 on the casing. A certain space 2004 may be preserved inside the casing to allow uniform flow distribution from the outlets 2002 to membrane flow channels.

Figure 21C:
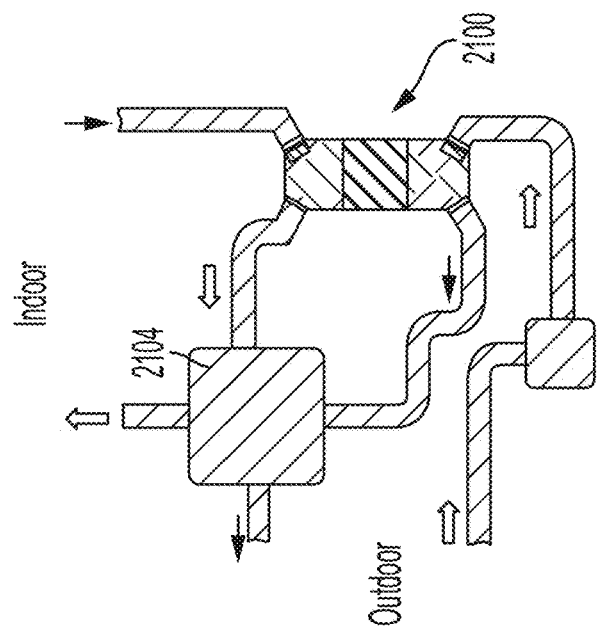
FIG. 21C is a plan view of a combination enthalpy recovery ventilation (ERV) with a particulate filter and a heat pump according to an embodiment.
Figure 21B:
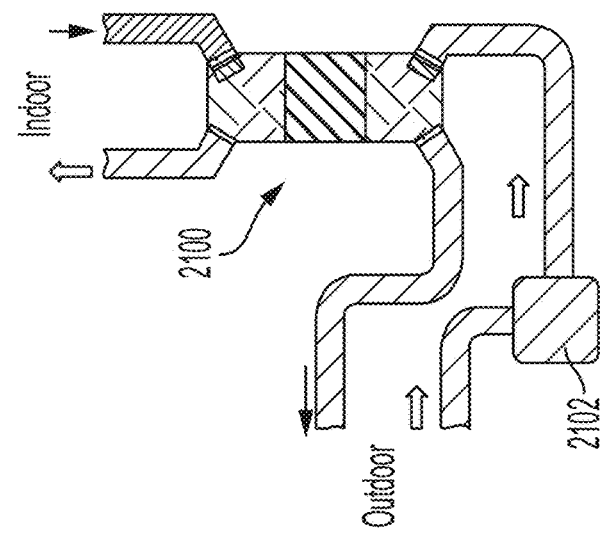
FIG. 21B is a plan view of a combination enthalpy recovery ventilation (ERV) with a particulate filter according to an embodiment.
Figure 21A:
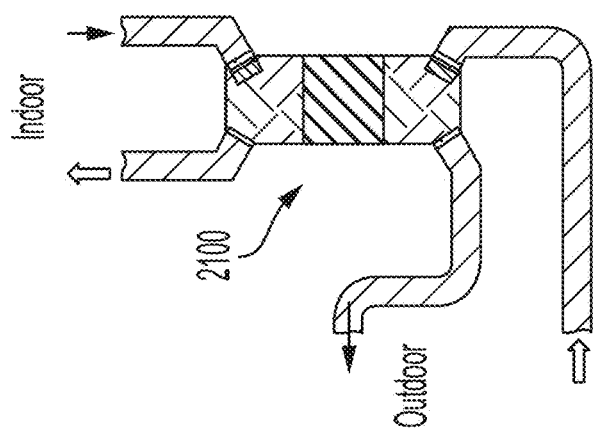
FIG. 21A is a plan view of a standalone enthalpy recovery ventilation (ERV) according to an embodiment.

Example VIII. Compact Membrane ERV for Air Conditioning of Buildings and Living Space The compact membrane ERV (m-ERV) 2100 comprising thin molecular sieve membrane sheets 118 described herein can be used to recover latent and sensible energy from any living spaces and buildings that require fresh air supply and discharge of indoor waste air, particularly to the application where the space is limited. For example, the compact light m-ERV 2100 can be readily installed inside cars, trains, buses, trucks, and high-rise apartments as illustrated in FIG. 21A. In these applications, the m-ERV 2100 is preferably operated with a fresh supply air and discharge air flows of the same flow rate. An inline particulate filter 2102 can be installed on the fresh air suction duct to remove particulates less than 2.5 μm (PM2.5) prior to entering m-ERV 2100 as illustrated in FIG. 21B). In practice, the temperature and humidity of fresh air after m-ERV 2100 cannot be the same as the indoor air. A miniature heat pump 2104 can be used to adjust temperature and humidity of the fresh air after m-ERV 2100 (FIG. 21C). The fresh air and discharge air flows can act as cold and hot sources of the heat pump 2104 so that no additional heat exchange with environment is required. Compared to stand-alone air conditioners, an integrated m-ERV 2100 with a heat pump 2104 can produce efficient air conditioning with a constant supply of fresh air and discharge indoor waste air. To stay healthy, carbon dioxide and other waste gases in the living space should be maintained below a certain level while the oxygen level is maintained above a certain level. Without need of external heat exchange, such an integrated unit may be readily installed.

The invention claimed is:

1. An air conditioning device comprising:
air fan configured to blow outdoor air into an air-conditioned space;
air fan configured to discharge air from the air-conditioned space to outdoors;
a membrane unit configured to conduct humidity and heat exchange between an indoor air flow drawn from the air-conditioned space and an outdoor air flow drawn from the outdoors;
a heat pump configured to transfer heat between the indoor air flow coming from the membrane unit and the outdoor air flow coming from the membrane unit.

2. The air conditioning device of claim 1, wherein the membrane unit comprises:
at least one water molecule-selective molecular sieve membrane sheet having a $H_2O$ permeance greater than $2 \times 10^{-6}$ mol/m$^2$/Pa/s, the at least one water molecule-selective molecular sieve membrane comprising a coating layer comprising molecular sieve crystals having a thickness less than 20 μm and located on a surface of a porous support sheet having a thickness less than 200 μm and a porosity of 20-55% and 90% of pores smaller than 2 μm;

at least one set of process flow channels having a height in a range of 0.3 to 2.0 mm, a hydraulic diameter in a range of 0.3 to 2.0 mm, an open-front area fraction greater than 0.5, and an open membrane area fraction greater than 0.5 for process flow;

at least one set of sweep flow channels having a height in a range of 0.3 to 2.0 mm, a hydraulic diameter in a range of 0.3 to 2.0 mm, an open-front area fraction greater than 0.5, and an open membrane area fraction greater than 0.5 for sweep flow;

wherein the at least one set of process flow channels and the at least one set of sweep flow channels are separated by the at least one water molecule-selective molecular sieve membrane sheet.

3. The air conditioning device of claim 2, wherein the at least one water molecule-selective molecular sieve membrane sheet allows water molecules to pass through while blocking or reducing permeation of other molecules in the at least one set of process flow channels or the at least one set of sweep flow channels.

4. The air conditioning device of claim 2, wherein the at least one water molecule-selective molecular sieve membrane sheet comprises a zeolite membrane located on a porous support sheet.

5. The air conditioning device of claim 2, wherein a volume fraction of the molecular sieve crystals in the coating layer is greater than 50%.

6. The air conditioning device of claim 2, wherein the thickness of the porous support sheet is less than 100 μm and the porosity is from 30 to 55%.

7. The air conditioning device of claim 2, wherein the at least one set of process flow channels and the at least one set of sweep flow channels are located on a flat plate frame.

* * * * *